(12) United States Patent
Kurvinkop et al.

(10) Patent No.: US 12,188,363 B2
(45) Date of Patent: Jan. 7, 2025

(54) AIR TURBINE STARTER

(71) Applicants: Unison Industries, LLC, Jacksonville, FL (US); General Electric Company, Schenectady, NY (US)

(72) Inventors: Amit Arvind Kurvinkop, Bengaluru (IN); David Raju Yamarthi, Bengaluru (IN); David Allan Dranschak, Union, OH (US); Brian Christopher Kemp, Troy, OH (US); Marc David Zinger, Dayton, OH (US); Parmeet Singh Chhabra, Bengaluru (IN); Roberto Karpik, Warsaw (PL); Eliel Fresco Rodriguez, Springboro, OH (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 18/613,901

(22) Filed: Mar. 22, 2024

(65) Prior Publication Data
US 2024/0229678 A1    Jul. 11, 2024

Related U.S. Application Data

(63) Continuation of application No. 18/307,457, filed on Apr. 26, 2023, now Pat. No. 11,959,387, which is a continuation of application No. 17/358,236, filed on Jun. 25, 2021, now Pat. No. 11,661,863.

(30) Foreign Application Priority Data

Aug. 18, 2020 (PL) ......................................... 434997

(51) Int. Cl.
*F01D 25/16* (2006.01)
*F02C 7/27* (2006.01)

(52) U.S. Cl.
CPC ................ *F01D 25/16* (2013.01); *F02C 7/27* (2013.01); *F05D 2220/32* (2013.01); *F05D 2240/54* (2013.01); *F05D 2260/85* (2013.01)

(58) Field of Classification Search
CPC . F01D 25/16; F01D 5/00; F01D 25/00; F02C 7/27; F02C 7/06; F02C 7/32; F02C 7/277; F05D 2220/32; F05D 2240/54; F05D 2260/85; F05D 2220/50; F05D 2240/52;
(Continued)

(56) References Cited

U.S. PATENT DOCUMENTS

| 3,087,305 A | 4/1963 | Hertzog |
| 4,871,296 A | 10/1989 | Laessle et al. |
| 4,914,906 A | 4/1990 | Burch |

(Continued)

FOREIGN PATENT DOCUMENTS

| CN | 108952970 B | 6/2021 |
| EP | 3495630 B1 | 9/2020 |

(Continued)

*Primary Examiner* — Jesse S Bogue
(74) *Attorney, Agent, or Firm* — McGarry Bair PC

(57) ABSTRACT

An air turbine starter that includes a housing. The housing can circumscribe a turbine coupled that is coupled to a gear train in a gear box via a drive shaft. The gear train can couple to an output shaft via at least a carrier. The air turbine starter can include at least a first bearing assembly and a second bearing assembly to rotatably support the drive shaft and the output shaft.

20 Claims, 6 Drawing Sheets

(58) Field of Classification Search
CPC ........... F05D 2250/36; F05D 2260/941; F05D 2240/55; F05D 2260/40311; Y02T 50/60
See application file for complete search history.

(56) References Cited

U.S. PATENT DOCUMENTS

| | | | |
|---|---|---|---|
| 5,127,220 A | 7/1992 | Jesrai et al. | |
| 5,160,005 A | 11/1992 | Burch | |
| 5,267,433 A | 12/1993 | Burch | |
| 6,318,958 B1 | 11/2001 | Giesler et al. | |
| 6,585,483 B2 | 7/2003 | Feest | |
| 7,033,134 B2 | 4/2006 | Bristol et al. | |
| 7,547,185 B2 | 6/2009 | Giesler et al. | |
| 8,475,116 B2 | 7/2013 | Trommer et al. | |
| 8,910,463 B2 | 12/2014 | Telakowski | |
| 9,028,208 B2 * | 5/2015 | Zawilinski | F01D 5/143 415/191 |
| 9,752,508 B2 | 9/2017 | Geck et al. | |
| 10,495,182 B2 | 12/2019 | Nayak et al. | |
| 10,519,866 B2 | 12/2019 | Nayak et al. | |
| 10,584,640 B2 | 3/2020 | Rodriguez et al. | |
| 11,125,109 B2 * | 9/2021 | Nayak | F02C 7/06 |
| 11,624,323 B2 * | 4/2023 | Chhabra | F01D 9/065 60/788 |
| 2005/0047912 A1 | 3/2005 | Giesler et al. | |
| 2012/0017723 A1 | 1/2012 | Makulec et al. | |
| 2012/0118103 A1 | 5/2012 | Blewett et al. | |
| 2015/0082805 A1 | 3/2015 | Zeiner et al. | |
| 2018/0010522 A1 | 1/2018 | Harder et al. | |
| 2018/0347669 A1 | 12/2018 | Nayak et al. | |
| 2019/0032566 A1 | 1/2019 | Martinez et al. | |
| 2019/0128141 A1 | 5/2019 | Pech et al. | |

FOREIGN PATENT DOCUMENTS

| | | |
|---|---|---|
| GB | 866046 A | 4/1961 |
| WO | 2005040580 A2 | 5/2005 |
| WO | 2018111422 A1 | 6/2018 |

\* cited by examiner

AIR TURBINE STARTER

CROSS-REFERENCE TO RELATED APPLICATION(S)

This application is a continuation application of U.S. patent application Ser. No. 18/307,457, filed Apr. 26, 2023, now allowed, which is a continuation of U.S. patent application Ser. No. 17/358,236, filed Jun. 25, 2021, now U.S. Pat. No. 11,661,863, issued May 30, 2023, which claims priority to Polish Application No. P.434997, filed Aug. 18, 2020, which are incorporated herein by reference in their entirety.

TECHNICAL FIELD

The disclosure generally relates to an air turbine starter, specifically the positioning of bearing assemblies in the air turbine starter.

BACKGROUND

A turbine engine, for example a gas turbine engine, is engaged in regular operation to an air turbine starter. Air turbine starters are typically mounted to the engine through a gear box or other transmission assembly. The transmission transfers power from the starter to the engine to assist in starting the engine. The internal components of both the turbine engine and the air turbine starter spin together such that the air turbine starter can be used to start the turbine engine.

A typical air turbine starter has a housing that is divided into a dry and wet portions by a seal structure. A turbine with a drive shaft is located in the dry portion, with part of the drive shaft extending through the seal structure. A gearbox with an output shaft is located in the wet portion and has an output shaft coupled to the engine. The drive shaft connects to the gear box such that rotation of the turbine rotates the drive shaft. The rotating drive shaft can rotate the gear box, which rotates the output shaft.

In typical air turbine starters, the bearing assemblies are a pair of axially spaced bearing assemblies, with first and second bearing assemblies upstream of the gear box. The first and second bearing assemblies rotatably supporting the drive shaft relative to one or more bearing housings in the seal structure. These bearings are subject to heat and stress during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGs., in which.

DETAILED DESCRIPTION

Figure 1:
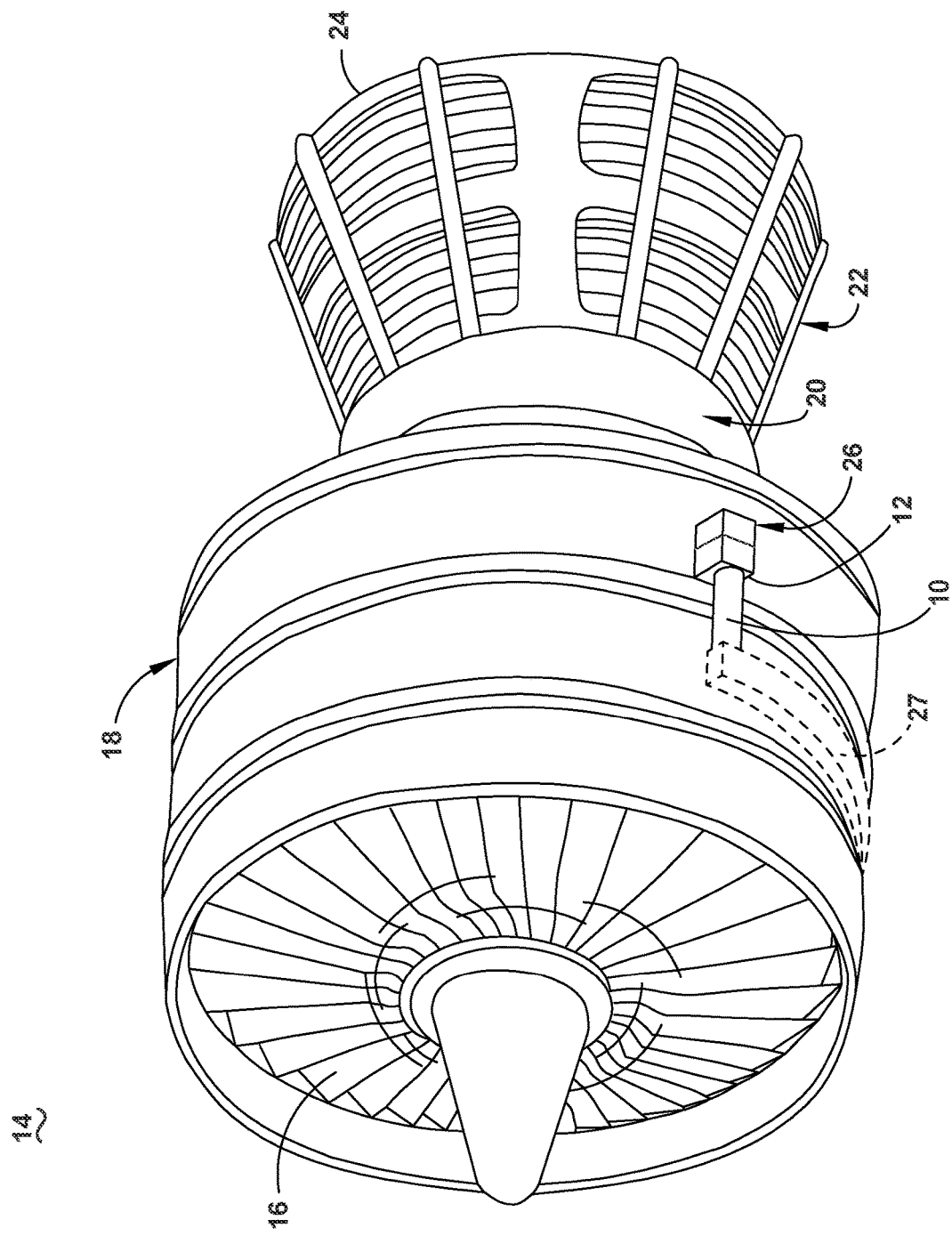
FIG. 1 is a schematic illustration of a turbine engine with an air turbine starter.

Aspects of the disclosure described herein are directed to a turbine engine with an air turbine starter that includes first and second bearing assemblies with an optional third bearing assembly. The first bearing assembly can be located in a more traditional location that is upstream of the gear box. The first bearing assembly can rotatably support the drive shaft relative to one or more portions of the housing or seal. The location of the second or third bearing assemblies, as disclosed herein, can reduce stress or heat experienced by one or more bearings in the air turbine starter. Further, additional bearing assemblies can be included to further rotatably support components, reduce stress, reduce heat, or allow the architecture of the air turbine starter to be more compact.

More specifically, the first bearing assembly rotatably supports the drive shaft relative to the housing, and the second bearing assembly rotatably supports at least one of the carrier or the output shaft relative to at least one of the drive shaft or housing. Even more specifically, the first bearing assembly can rotatably support the drive shaft relative to seal structure the second bearing assembly can rotatably support the carrier relative to the drive shaft.

For purposes of illustration, the present disclosure will be described with respect to an air turbine starter for an aircraft turbine engine. For example, the disclosure can have applicability in other vehicles or engines, and can be used to provide benefits in industrial, commercial, and residential applications. Further non-limiting examples of other vehicles or engines to which the disclosure can relate can include boats, cars, or other aquatic or land vehicles. Industrial, commercial, or residential applications of the disclosure can include, but are not limited to, marine power plants, wind turbines, small power plants, or helicopters.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

While illustrated as roller bearings, it is contemplated that any one or all of the bearings disclosed herein can be a ball bearing, tapered bearing, deep groove bearing, plane bearing, fluid bearing, flexure bearing, magnetic bearing, or any other structure or bearing that reduces friction of a rotating part.

Referring to FIG. 1, a starter motor or air turbine starter 10 is coupled to an accessory gear box (AGB) 12, also known as a transmission housing, and together are schematically illustrated as being mounted to a turbine engine 14 such as a gas turbine engine. The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of the shaft to power the fan 16.

The turbine engine can be a turbofan engine, such as a General Electric GEnx or CF6 series engine, commonly used in modern commercial and military aviation or it could be a variety of other known turbine engines such as a turboprop or turboshaft.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the mechanical power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high pressure compression region 18. Optionally, an air intake conduit 27 can couple to the air turbine starter 10. The air intake conduit 27 can supply the air turbine starter 10 with pressurized air.

Figure 2:
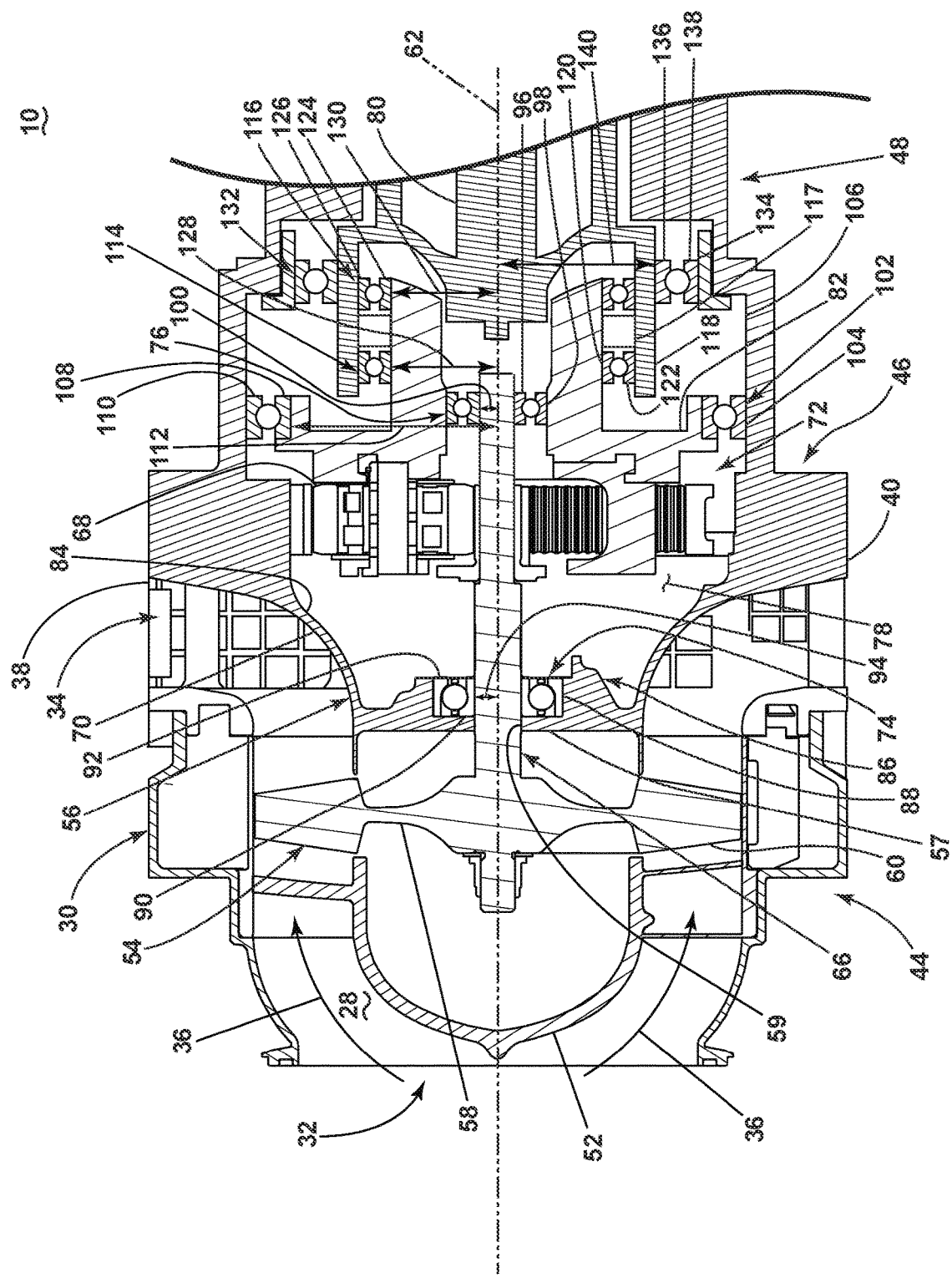
FIG. 2 is an enlarged schematic cross-section view of a portion of the air turbine starter of FIG. 1.

Referring now to FIG. 2, an exploded cross section of a portion of the air turbine starter 10. Generally, the air turbine starter 10 includes a housing 30 defining an interior 28 having a primary inlet 32 and a primary outlet 34. A primary air flow path 36, illustrated schematically with an arrow, extends between the primary inlet 32 and the primary outlet 34 for communicating a flow of fluid, including, but not limited to gas, compressed air, or the like, there through. The primary outlet 34 can include a plurality of circumferentially arranged openings 38 in a peripheral wall 40 of the housing 30. In this configuration, the primary inlet 32 is an axial inlet and the primary outlet 34 is a radial or circumferential outlet alone the periphery of the housing 30.

The housing 30 can be made up of two or more parts that are combined together or can be integrally formed as a single piece. In the depicted aspects of the disclosure, the housing 30 of the air turbine starter 10 generally defines, in an axial series arrangement, an inlet turbine section 44, a gearbox section 46, and a drive section 48. A seal structure 56 can be coupled to or unitarily formed with the housing 30. It is contemplated that the seal structure 56 can divide the interior 28 into the inlet turbine section 44 and the gearbox section 46. The air turbine starter 10 can be formed by any materials and methods, including, but not limited to, additive manufacturing or die-casting of high strength and lightweight metals such as aluminum, stainless steel, iron, or titanium. The housing 30 and the gearbox section 46 can be formed with a thickness sufficient to provide adequate mechanical rigidity without adding unnecessary weight to the air turbine starter 10 and, therefore, the aircraft.

The inlet turbine section 44 can include the primary inlet 32, stationary portions 52, a turbine 54, the primary outlet 34, and at least a portion of the seal structure 56. In one non-limiting example fluid or air is supplied to the primary inlet 32 from either a ground-operating air cart, an auxiliary power unit, or a cross-bleed start from an engine already operating. The stationary portions 52 can guide air from the primary inlet 32 to the turbine 54 by defining at least a portion of a primary air flow path 36.

The turbine 54 can include a disc or rotor 58 and a plurality of circumferentially spaced blades 60. The rotor 58 can be mounted to the housing in a manner for rotation, for example, the rotor 58 can be circumscribed by the housing 30. The plurality of circumferentially spaced blades 60 can be disposed in the primary air flow path 36 for rotatably extracting mechanical power from the flow of gas from the primary inlet 32 to the primary outlet 34. The turbine 54, the rotor 58, and the plurality of circumferentially spaced blades 60 can rotate about a centerline or axis of rotation 62.

The turbine 54 can further include a drive shaft 66. The drive shaft 66 can be coupled to or is unitarily formed with the rotor 58 of the turbine 54 allowing for the transfer of energy from air in the primary air flow path 36 to mechanical power. The drive shaft 66 can extend through at least a portion of the inlet turbine section 44 or the gearbox section 46.

The seal structure 56 can define a portion of the primary air flow path 36. By way non-limiting example, a forward wall 70 of the seal structure 56 can guide air from the turbine 54 to the primary outlet 34. The seal structure 56 can include a structural wall 57 that bears a seal 59. The seal 59 can be proved between the structural wall 57 and the drive shaft 66.

A rear wall 84 and a central wall 86 of the seal structure 56 can define a portion of a first cavity 78. The first cavity 78 can be a wet portion of the housing 30. That is, a turbine thrust bearing or first bearing assembly 74 or a turbine pre-load bearing or second bearing assembly 76 can be lubricated with a grease or oil in the first cavity 78 of the housing 30. The first cavity 78 is a portion in the housing 30 that is exposed to grease, oil, or other know coolants or liquids, whereas a dry portion can be a cavity or portion that is not exposed to liquid. By way of non-limiting example of contrast, the forward side of the turbine 54 is a dry portion of the housing 30.

By way of non-limiting example, the drive shaft 66 can couple the turbine 54 to one or more gears or clutch assemblies, such as a gear train 68, in the gearbox section 46. The gearbox section 46 can include at least a gear box 72 that can include the gear train 68, the first bearing assembly 74, the second bearing assembly 76, the first cavity 78, and an output shaft 80. The gear box 72 can contain the gear train 68 that couples the drive shaft 66 to the output shaft 80, so that when driven by the drive shaft 66, the gear train 68 can transfer mechanical power to the output shaft 80. The gear train 68 can, for example, be a planetary gear system with a sun gear, a ring gear, and planet gears, which are supported by a carrier 82, which carries the output shaft 80 to the turbine engine 14. However, any gear train 68 having the carrier 82 or similar structure that operably couples the drive shaft 66 to the output shaft 80 is contemplated. The carrier 82 can extend axially beyond the gear train 68.

The first bearing assembly 74 can rotationally support the drive shaft 66 to one of the housing 30 or seal structure 56. As illustrated, by way of non-limiting example, the first bearing assembly 74 is positioned between a first portion 88 of the central wall 86 of the seal structure 56 and the drive shaft 66. That is, the first bearing assembly 74 can be circumscribed by the first portion 88 of the seal structure 56 where the first bearing assembly 74 rotatably supports the drive shaft 66 relative to the seal structure 56. The first bearing assembly 74 can include a first bearing inner race 90 and a first bearing outer race 92, with rollers located between the races. The first bearing inner race 90 can rotate with the drive shaft 66, while the first bearing outer races 92 can be fixed relative the seal structure 56 or the housing 30. A first radial distance 94 can be defined as the perpendicular distance from the axis of rotation 62 a first inner portion or the first bearing inner race 90.

Axially, the first bearing assembly 74 can be located between the rotor 58 and the gear train 68. That is, the first bearing assembly 74 can be downstream of the rotor 58 and upstream of the gear box 72 or gear train 68. It is contemplated that the first bearing assembly 74 is fluidly coupled to the first cavity 78. It is further contemplated that the first bearing assembly 74 can be lubricated using any number of systems. While illustrated as a single roller, the first bearing assembly 74 can include any number or style of rollers.

The second bearing assembly 76 can rotationally support at least one of the carrier 82 or output shaft 80 relative to at least one of the drive shaft 66 or housing 30. As illustrated, by way of non-limiting example, the second bearing assembly 76 rotatably supports the carrier 82 relative to the drive shaft 66. That is, the second bearing assembly 76 can be radially located between the drive shaft 66 and the carrier 82. The second bearing assembly 76 can be circumscribed by the carrier 82 and rotationally support both the carrier 82 and the drive shaft 66.

The second bearing assembly 76 pre-loads or takes some of the load from the first bearing assembly 74. Pre-loading the first bearing assembly 74 can reduce the operating temperature of the first bearing assembly 74 which improves performance and life of the first bearing assembly 74.

The first and second bearing assemblies 74, 76 can provide a saddle mount for the drive shaft 66; that is, there is at least one bearing assembly rotatably supporting the drive shaft 66 on each side of the gear box 72. The saddle mount results in better alignment of the drive shaft 66 in the first bearing assembly 74 or thrust bearing. The saddle mount also provides better radial alignment of the drive shaft 66 in the second bearing assembly 76 and the gear train 68. Further, the saddle mount also allows for a shorter axial length of the air turbine starter 10, as only the first bearing assembly 74, is located upstream of the gear box 72.

The second bearing assembly 76 can include a second bearing inner race 96 and a second bearing outer race 98, with rollers located between the races. As illustrated, the second bearing inner race 96 can rotate with the drive shaft 66. The second bearing outer race 98 can rotate with the carrier 82. That is, the second bearing inner and outer races 96, 98 can both rotate. A second radial distance 100 can be defined as the perpendicular distance from the axis of rotation 62 to an inner portion or the second bearing inner race 96. The first radial distance 94 can be greater than or equal to the second radial distance 100. However, it is contemplated that the first radial distance 94 can be less than the second radial distance 100.

The second bearing assembly 76 can be axially located downstream of the gear box 72 or gear train 68. It is contemplated that the second bearing assembly 76 is fluidly coupled to the first cavity 78. Additionally, or alternatively, it is contemplated that the second bearing assembly 76 can be lubricated using any number of systems. While illustrated as a single roller, the second bearing assembly 76 can include any number or style of rollers.

A carrier thrust bearing or third bearing assembly 102 can be included in the air turbine starter 10. The third bearing assembly 102 can rotatably support the carrier 82. As illustrated by way of non-limiting example, the third bearing assembly 102 is illustrated as rotatably supporting the carrier 82 relative to a second portion 104 of the housing 30. The second portion 104 of the housing 30 can be a portion of an interior side 106 of the peripheral wall 40. That is, the third bearing assembly 102 can be radially located between the carrier 82 and the peripheral wall 40 of the housing 30.

The third bearing assembly 102 can include a third bearing inner race 108 and a third bearing outer race 110, with rollers located between the races. As illustrated, the third bearing inner race 108 can rotate with the carrier 82. The third bearing outer races 110 can be fixed relative the housing 30. A third radial distance 112 can be defined as the perpendicular distance from the axis of rotation 62 to an inner portion or the third bearing inner race 108. The third radial distance 112 can be greater than the first radial distance 94 or the second radial distance 100. However, it is contemplated that the third radial distance 112 can be less than or equal to the first radial distance 94 or the second radial distance 100.

The third bearing assembly 102 can be axially located downstream of the gear train 68. It is contemplated that the third bearing assembly 102 is fluidly coupled to the first cavity 78. Additionally, or alternatively, it is contemplated that the third bearing assembly 102 can be lubricated using any number of systems. While illustrated as a single roller, the third bearing assembly 102 can include any number or style of rollers.

The third bearing assembly 102 can axially align with at least a portion of the second bearing assembly 76. That is, at least a portion of the third bearing assembly 102 can circumscribe at least a portion of the second bearing assembly 76.

The second bearing assembly 76 can preload or reduce forces on the third bearing assembly 102. Further, the partial radial alignment of the third bearing assembly 102 and the second bearing assembly 76 can axially align the carrier 82 in the gear train 68.

The location of the third bearing assembly 102 can provide radial stiffness to the second bearing assembly 76 through the transfer of support of the second bearing assembly 76 from the carrier 82 to the housing 30.

A clutch thrust bearing or fourth bearing assembly 114 and a clutch preload bearing or fifth bearing assembly 116 can be included in the air turbine starter 10. The fourth and fifth bearing assemblies 114, 116 can rotatably support the carrier 82 and a portion of an output arm 118, where the output arm 118 can couple to the output shaft 80. The output arm 118 can be selectively coupled to the carrier 82. By way of non-limiting example, the output arm 118 and the carrier 82 can be coupled by one or more clutch assemblies (not shown).

As illustrated by way of non-limiting example, the fourth and fifth bearing assemblies 114, 116 are illustrated as rotatably supporting the carrier 82 and the output arm 118. That is, the fourth and fifth bearing assemblies 114, 116 can be radially located between the carrier 82 and the output arm 118.

The fourth and fifth bearing assemblies 114, 116 can include a fourth bearing inner race 120, a fourth bearing outer race 122, a fifth bearing inner race 124 and a fifth bearing outer race 126, with rollers located between the corresponding races. As illustrated, the fourth and fifth bearing inner races 120, 124 can rotate with the carrier 82. The fourth and fifth bearing outer races 122, 126 can rotate with the output arm 118. A fourth radial distance 128 can be defined as the perpendicular distance from the axis of rotation 62 to an inner portion or the fourth bearing inner race 120. A fifth radial distance 130 can be defined as the perpendicular distance from the axis of rotation 62 to an inner portion or the fifth bearing inner race 124.

As illustrated, by way of non-limiting example, the fourth and fifth radial distance 128, 130 can be equal. However, it is contemplated that the fourth radial distance 128 can be greater than or less than the fifth radial distance 130.

Similarly, the fourth and fifth radial distances 128, 130 can be greater than the first radial distance 94 or the second radial distance 100 and less than the third radial distance 112, however, any combination is contemplated.

The fourth and fifth bearing assemblies 114, 116 can be axially located downstream of the gear train 68. While illustrated as a single bearing assembly or as having a single roller, the fourth or fifth bearing assemblies 114, 116 can include any number of bearings assemblies or rollers.

The fifth bearing assembly 116 can preload or a reduce forces on the fourth bearing assembly 114. Further, the fourth and fifth bearing assemblies 114, 116 can provide radial alignment and stability to the output shaft 80 about the axis of rotation 62. The axial spacing between the fourth and fifth bearing assemblies 114, 116 provides radial support for the carrier 82.

One or more portions of a clutch assembly 117 can be located between the fourth and fifth bearing assemblies 114, 116. However, it is contemplated that one or more portions of the clutch assembly 117 can located upstream of the fourth bearing assembly 114 or downstream of the fifth bearing assembly 116. The clutch assembly 117 can selectively engage the carrier 82 and the output shaft 80. The fourth and fifth bearing assemblies 114, 116 can provide axial or radial stabilization for the clutch assembly 117.

A drive preload bearing or sixth bearing assembly 132 can be included in the air turbine starter 10. The sixth bearing assembly 132 can rotatably support the output arm 118. As illustrated by way of non-limiting example, the sixth bearing assembly 132 is illustrated as rotatably supporting the output arm 118 relative to a third portion 134 of the housing 30. The third portion 134 of the housing 30 can be a protrusion, extension, or additional structure(s) coupled to or formed with the housing 30. That is, the sixth bearing assembly 132 can be radially located between the output arm 118 and the fourth portion of the housing 30. The sixth bearing assembly 132 can be circumscribed by the housing 30 and rotationally support the output arm 118 relative to the housing 30.

The sixth bearing assembly 132 can include a sixth bearing inner race 136 and a sixth bearing outer race 138, with rollers located between the races. As illustrated, the sixth bearing inner race 136 can rotate with the output arm 118. The sixth bearing outer races 138 can be fixed relative the housing 30. A sixth radial distance 140 can be defined as the perpendicular distance from the axis of rotation 62 to an inner portion or the sixth bearing inner race 136. As illustrated, by way of non-limiting example, the sixth radial distance 140 can be greater than the first radial distance 94, the second radial distance 100, the fourth radial distance 128, or the fifth radial distance 130 and less than or equal to the third radial distance 112, however, any combination is contemplated.

The sixth bearing assembly 132 can be axially located downstream of the gear train 68. While illustrated as a single roller, the sixth bearing assembly 132 can include any number of rollers. While illustrated with six bearing assemblies, it is contemplated that the gearbox section 46 and the drive section 48 can include any number of bearing assemblies with any number or style of rollers. The partial radial alignment of the sixth bearing assembly 132 and the fifth bearing assembly 116 can axially align an output arm 118 or the output shaft 80 relative to the carrier 82.

The location of the third bearing assembly 102 in relationship to the location of the fifth and sixth bearing assemblies 116, 132 reduces the dynamics of the carrier 82. That is, the third, fifth, and sixth bearing assemblies 102, 116, 132 provide axial or radial support for the carrier 82. The support provided to the carrier 82 can reduce vibrations of the carrier 82. It is contemplated that the location of the third, fifth, and sixth bearing assemblies 102, 116, 132 can reduce vibration, axial force, or radial motion of other components of the starter 10.

In operation, a fluid, for example air, is supplied to the air turbine starter 10. The air enters the primary air flow path 36 through the primary inlet 32. The energy from the air is transformed to mechanical energy by the turbine 54 which rotates in response to the air flow through the plurality of circumferentially spaced blades 60. The rotor 58 of the turbine 54 is coupled to the drive shaft 66, such that the rotational energy from the rotor 58 can be transferred to the gearbox section 46 via the drive shaft 66. The drive shaft 66 is rotatably supported by at least one bearing assembly, illustrated by the first bearing assembly 74 and the second bearing assembly 76.

The rotation of the drive shaft 66 rotates the sun gear in the gear train 68 of the gear box 72 in the gearbox section 46. As the sun gear rotates, the sun gear can rotatably drive the planetary gears of the gear train 68. That is, as the sun gear rotates, the planetary gears precess and rotate relative the fixed ring gear. The ring gear can be fixed to the seal structure 56, the housing 30, or other non-rotating portions of the air turbine starter 10. The precessing planetary gears effect the rotation of the carrier 82. That is, as the planetary gears precess, the carrier 82 can rotate. The carrier 82 can be rotatably supported by another bearing assembly, illustrated as the third, fourth, and fifth bearing assemblies 102, 114, 116.

The carrier 82 can be selectively coupled to the output arm 118 or the output shaft 80 via one or more selectable assemblies, such as, but not limited to a clutch. The output arm 118 can be rotatably supported by, for example, the fourth, fifth, and sixth bearing assemblies 114, 116, 132. The output shaft 80 provides rotational output that will result in starting the turbine engine 14.

Figure 3:
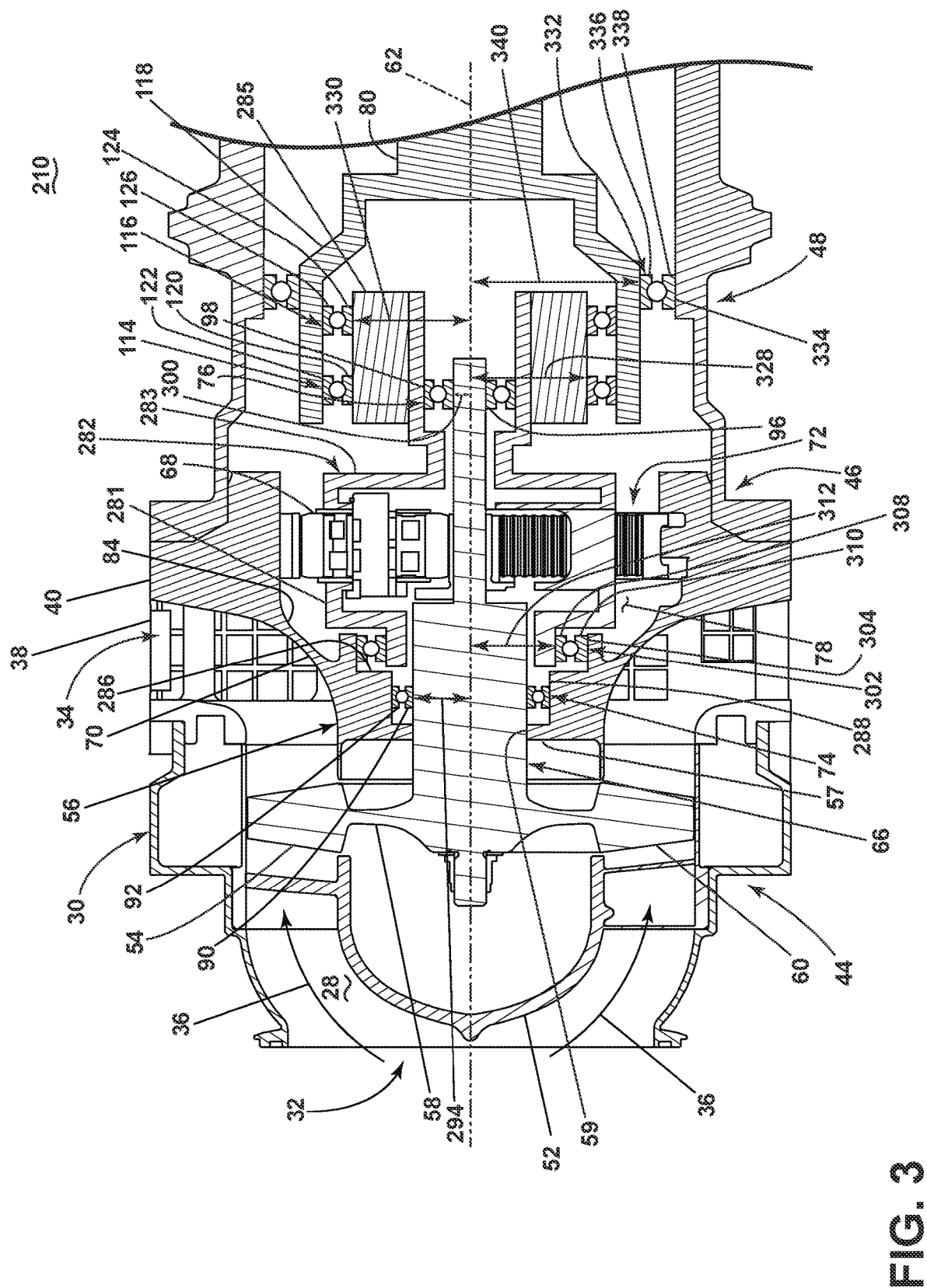
FIG. 3 is a variation of the schematic cross-section of FIG. 2.

FIG. 3 is another example of an air turbine starter 210. The air turbine starter 210 is similar to the air turbine starter 10, therefore, like parts will be identified with like numerals increased by 200, with it being understood that the description of the like parts of the air turbine starter 10 apply to the air turbine starter 210, unless otherwise noted.

Generally, the air turbine starter 210 includes the housing 30 defining the interior 28 having the primary inlet 32 and the primary outlet 34. The primary air flow path 36, illustrated schematically with an arrow, extends between the primary inlet 32 and the primary outlet 34 for communicating a flow of fluid, including, but not limited to gas, compressed air, or the like, there through. The primary outlet 34 can include the plurality of circumferentially arranged openings 38 in the peripheral wall 40 of the housing 30. In this configuration, the primary inlet 32 is an axial inlet and the primary outlet 34 is a radial or circumferential outlet alone the periphery of the housing 30.

The housing 30 can include, in an axial series arrangement, the inlet turbine section 44, the gearbox section 46, and the drive section 48. The seal structure 56 can be coupled to or unitarily formed with the housing 30. It is contemplated that the seal structure 56 can divide the interior 28 into the inlet turbine section 44 and the gearbox section 46.

The inlet turbine section 44 can include the primary inlet 32, stationary portions 52, the turbine 54, the primary outlet 34, and at least a portion of the seal structure 56. The stationary portions 52 can guide air from the primary inlet 32 to the turbine 54 by defining at least a portion of the primary air flow path 36.

The turbine 54 can include the disc or rotor 58 and the plurality of circumferentially spaced blades 60. The turbine 54, the rotor 58, and the plurality of circumferentially spaced blades 60 can rotate about the centerline or axis of rotation 62.

The turbine 54 can further include the drive shaft 66. The drive shaft 66 can be coupled to or is unitarily formed with the rotor 58 of the turbine 54 allowing for the transfer of energy from air in the primary air flow path 36 to mechanical power. The drive shaft 66 can extend through at least a portion of the inlet turbine section 44 or the gearbox section 46.

The seal structure 56 can define a portion of the primary air flow path 36. By way non-limiting example, the forward wall 70 of the seal structure 56 can guide air from the turbine 54 to the primary outlet 34. The seal structure 56 can include the structural wall 57 that bears the seal 59. The seal 59 can be proved between the structural wall 57 and the drive shaft 66.

The rear wall 84 and a central wall 286 of the seal structure 56 can define a portion of the first cavity 78. The first cavity 78 can be a wet portion of the housing 30. That is, the turbine thrust bearing or first bearing assembly 74 or the turbine pre-load bearing or second bearing assembly 76 can be lubricated with a grease or oil in the first cavity 78 of the housing 30. The first cavity 78 is a portion in the housing 30 that is exposed to grease, oil, or other know coolants or liquids.

By way of non-limiting example, the drive shaft 66 can couple the turbine 54 to one or more gears or clutch assemblies, such as the gear train 68, in the gearbox section 46. The gearbox section 46 can include at least the gear box 72 that can include the gear train 68, the first bearing assembly 74, the second bearing assembly 76, the first cavity 78, and the output shaft 80. The gear box 72 can contain the gear train 68 that couples the drive shaft 66 to the output shaft 80, so that when driven by the drive shaft 66, the gear train 68 can transfer mechanical power to the output shaft 80. The gear train 68 can, for example, be a planetary gear system with a sun gear, a ring gear, and planet gears, which are supported by a carrier 282. The carrier 282 can include an upstream carrier portion 281 and a downstream carrier portion 283. The upstream carrier portion 281 extends axially from the gear train 68 in the upstream direction towards the turbine 54. The downstream carrier portion 283 extends axially from the gear train 68 in the downstream direction towards the output shaft 80 or downstream from the gear train 68. Any gear train 68 having the carrier 282 or similar structure that operably couples the drive shaft 66 to the output shaft 80 is contemplated.

The first bearing assembly 74 can rotationally support the drive shaft 66 to one of the housing 30 or seal structure 56. As illustrated, by way of non-limiting example, the first bearing assembly 74 is positioned between a first portion 288 of the central wall 286 of the seal structure 56 and the drive shaft 66. That is, the first bearing assembly 74 can be circumscribed by the first portion 288 of the seal structure 56 where the first bearing assembly 74 rotatably supports the drive shaft 66 relative to the seal structure 56. The first bearing assembly 74 can include the first bearing inner race 90 and the first bearing outer race 92, with rollers located between the races. The first bearing inner race 90 can rotate with the drive shaft 66, while the first bearing outer races 92 can be fixed relative the seal structure 56 or the housing 30. A first radial distance 294 can be defined as the perpendicular distance from the axis of rotation 62 the first inner portion or the first bearing inner race 90.

Axially, the first bearing assembly 74 can be located between the rotor 58 and the gear train 68. That is, the first bearing assembly 74 can be downstream of the rotor 58 and upstream of the gear box 72 or gear train 68. It is contemplated that the first bearing assembly 74 is fluidly coupled to the first cavity 78. It is further contemplated that the first bearing assembly 74 can be lubricated using any number of systems.

The second bearing assembly 76 can rotationally support at least one of the carrier 282 or output shaft 80 relative to at least one of the drive shaft 66 or housing 30. As illustrated, by way of non-limiting example, the second bearing assembly 76 rotatably supports the downstream carrier portion 283 relative to the drive shaft 66. That is, the second bearing assembly 76 can be radially located between the drive shaft 66 and the downstream carrier portion 283. The second bearing assembly 76 can be circumscribed by the downstream carrier portion 283 of the carrier 282 and rotationally support both the carrier 282 and the drive shaft 66.

The second bearing assembly 76 pre-loads or takes some of the load from the first bearing assembly 74. Pre-loading the first bearing assembly 74 can reduce the operating temperature of the first bearing assembly 74 which improves performance and life of the first bearing assembly 74.

The first and second bearing assemblies 74, 76 provide the saddle mount for the drive shaft 66. That is, there is at least one bearing assembly rotatably supporting the drive shaft 66 on each side of the gear box 72. The saddle mount results in better alignment of the drive shaft 66 in the first bearing assembly 74 or thrust bearing. The saddle mount also provides better radial alignment of the drive shaft 66 in the second bearing assembly 76 and the gear train 68. Further, the saddle mount also allows for a shorter axial length of the air turbine starter 210, as only the first bearing assembly 74, is located upstream of the gear box 72.

The second bearing assembly 76 can include the second bearing inner race 96 and the second bearing outer race 98, with rollers located between the races. As illustrated, the second bearing inner race 96 can rotate with the drive shaft 66. The second bearing outer race 98 can rotate with the downstream carrier portion 283. That is, the second bearing inner and outer races 96, 98 can both rotate. A second radial distance 300 can be defined as the perpendicular distance from the axis of rotation 62 to an inner portion or the second bearing inner race 96. The first radial distance 294 can be greater than or equal to the second radial distance 300. However, it is contemplated that the first radial distance 294 can be less than the second radial distance 300.

The second bearing assembly 76 can be axially located downstream of the gear box 72 or gear train 68. It is contemplated that the second bearing assembly 76 is fluidly coupled to the first cavity 78. Additionally, or alternatively, it is contemplated that the second bearing assembly 76 can be lubricated using any number of systems.

A carrier thrust bearing or third bearing assembly 302 can be included in the air turbine starter 210. The third bearing assembly 302 can rotatably support the carrier 282. As illustrated by way of non-limiting example, the third bearing assembly 302 is illustrated as rotatably supporting the upstream carrier portion 281 relative to a second position or a portion 304 of the housing 30. That is, the third bearing assembly 302 can be radially located between the upstream carrier portion 281 of the carrier 282 and the second portion 304 the housing 30.

The third bearing assembly 302 can include a third bearing inner race 308 and a third bearing outer race 310, with rollers located between the races. As illustrated, the third bearing inner race 308 can rotate with the upstream carrier portion 281. The third bearing outer races 310 can be fixed relative the housing 30 at the second portion 304. A third radial distance 312 can be defined as the perpendicular distance from the axis of rotation 62 to an inner portion or the third bearing inner race 308. The third radial distance 312 can be greater than the first radial distance 294 or the second radial distance 300. However, it is contemplated that the third radial distance 312 can be less than or equal to the first radial distance 294 or the second radial distance 300.

The third bearing assembly 302 can be axially located upstream of the gear train 68. It is contemplated that the third bearing assembly 302 is fluidly coupled to the first cavity 78. Additionally, or alternatively, it is contemplated that the third bearing assembly 302 can be lubricated using any number of systems. While illustrated as a single roller, the third bearing assembly 302 can include any number or style of rollers.

The second bearing assembly 76 and the third bearing assembly 302 can provide a saddle mount for the carrier 282, as each of the bearing that rotatably support the carrier 282 are on either side of the gear train 68. This radially improves alignment of the carrier 282 in the gear train 68.

The second bearing assembly 76 or the third bearing assembly 302 can have steel sleeves that mount into aluminum housing which can reduce the weight of the starter 10. Further, the saddle mount for the carrier 282 provided by the second and third bearing assemblies 76, 302 can reduce the overall size of the starter 10. Further, the location of the gear box 72 as provided by the location of the second and third bearing assemblies 76, 302 can allow the gearbox to be positioned closer to the AGB 12, decreasing inertia moments.

The clutch thrust bearing or fourth bearing assembly 114 and the clutch preload bearing or fifth bearing assembly 116 can be included in the air turbine starter 210. The fourth and fifth bearing assemblies 114, 116 can rotatably support the carrier 282 or an engagement structure 285 and a portion of an output arm 118, where the output arm 118 can couple to the output shaft 80. The fourth and fifth bearing assemblies 114, 116 can be axially located downstream of the gear train 68.

The output arm 118 can be selectively coupled to the carrier 282 or engagement structure 285. The engagement structure 285 can be selectively coupled or fixed to the downstream carrier portion 283. That is, any number of assemblies (not shown) or selectable coupling devices or techniques (not shown) are contemplated at the interface of the carrier 282 and the engagement structure 285 or at the interface of the engagement structure 285 and the output arm 118 or output shaft 80. It is contemplated that the engagement structure 285 and respective bearing assemblies can be replaced with the clutch assembly 117 illustrated in FIG. 2.

As illustrated by way of non-limiting example, the fourth and fifth bearing assemblies 114, 116 are illustrated as rotatably supporting the downstream carrier portion 283 and the output arm 118. That is, the fourth and fifth bearing assemblies 114, 116 can be radially located between the downstream carrier portion 283 and the output arm 118.

The fourth and fifth bearing assemblies 114, 116 can include the fourth bearing inner race 120, the fourth bearing outer race 122, the fifth bearing inner race 124 and the fifth bearing outer race 126, with rollers located between the corresponding races. As illustrated, the fourth and fifth bearing inner races 120, 124 can rotate with the downstream carrier portion 283. The fourth and fifth bearing outer races 122, 126 can rotate with the output arm 118. A fourth radial distance 328 can be defined as the perpendicular distance from the axis of rotation 62 to an inner portion or the fourth bearing inner race 120. A fifth radial distance 330 can be defined as the perpendicular distance from the axis of rotation 62 to an inner portion or the fifth bearing inner race 124.

As illustrated, by way of non-limiting example, the fourth and fifth radial distance 328, 330 can be equal. However, it is contemplated that the fourth radial distance 328 can be greater than or less than the fifth radial distance 330.

The fourth and fifth radial distances 328, 330 can be greater than the first radial distance 294, the second radial distance 300, or the third radial distance 312. However, any combination of greater than, less than, or equal to among the first, second, third, fourth, and fifth radial distances 294, 300, 312, 328, 330 is contemplated.

The partial radial alignment of the fourth bearing assembly 114 and the second bearing assembly 76 can help axially align the carrier 282 relative to the gear train 68 and the drive shaft 66. The fifth bearing assembly 116 can preload or a reduce forces on the fourth bearing assembly 114. Further, the fourth and fifth bearing assemblies 114, 116 can provide radial alignment and stability to the output shaft 80 about the axis of rotation 62. The axial spacing between the fourth and fifth bearing assemblies 114, 116 provides radial support for the carrier 82. Further, the fourth and fifth bearing assemblies 114, 116 can provide axial and radial stabilization for the engagement structure 285. Additionally, or alternatively, the fourth and fifth bearing assemblies 114, 116 can provide support for one or more clutch assemblies.

A drive preload bearing or sixth bearing assembly 332 can be included in the air turbine starter 210. The sixth bearing assembly 332 can rotatably support the output arm 118. As illustrated by way of non-limiting example, the sixth bearing assembly 332 is illustrated as rotatably supporting the output arm 118 relative to a third portion 334 of the housing 30. The third portion 334 of the housing 30 an be a protrusion, extension, or additional structure(s) coupled to or formed with the housing 30. That is, the sixth bearing assembly 332 can be radially located between the output arm 118 and the third portion 334 of the housing 30. The sixth bearing assembly 332 can be circumscribed by the housing 30 and rotationally support the output arm 118 relative to the housing 30.

The sixth bearing assembly 332 can include a sixth bearing inner race 336 and a sixth bearing outer race 338, with rollers located between the races. As illustrated, the sixth bearing inner race 336 can rotate with the output arm 118. The sixth bearing outer races 338 can be fixed relative the housing 30. A sixth radial distance 340 can be defined as the perpendicular distance from the axis of rotation 62 to an inner portion or the sixth bearing inner race 336. As illustrated, by way of non-limiting example, the sixth radial distance 340 can be greater than the first, second, third, fourth, and fifth radial distances 294, 300, 312, 328, 330, however, any combination is contemplated.

The sixth bearing assembly 332 can be axially located downstream of the gear train 68. While illustrated as a single roller, the sixth bearing assembly 332 can include any number of rollers. While illustrated with six bearing assemblies, it is contemplated that the gearbox section 46 and the drive section 48 of the air turbine starter 210 can include any number of bearing assemblies with any number or style of rollers. The sixth bearing assembly 332 can provide axial or radial stiffness or support to the output shaft 80, the drive shaft 66, or the engagement structure 285.

Figure 4:
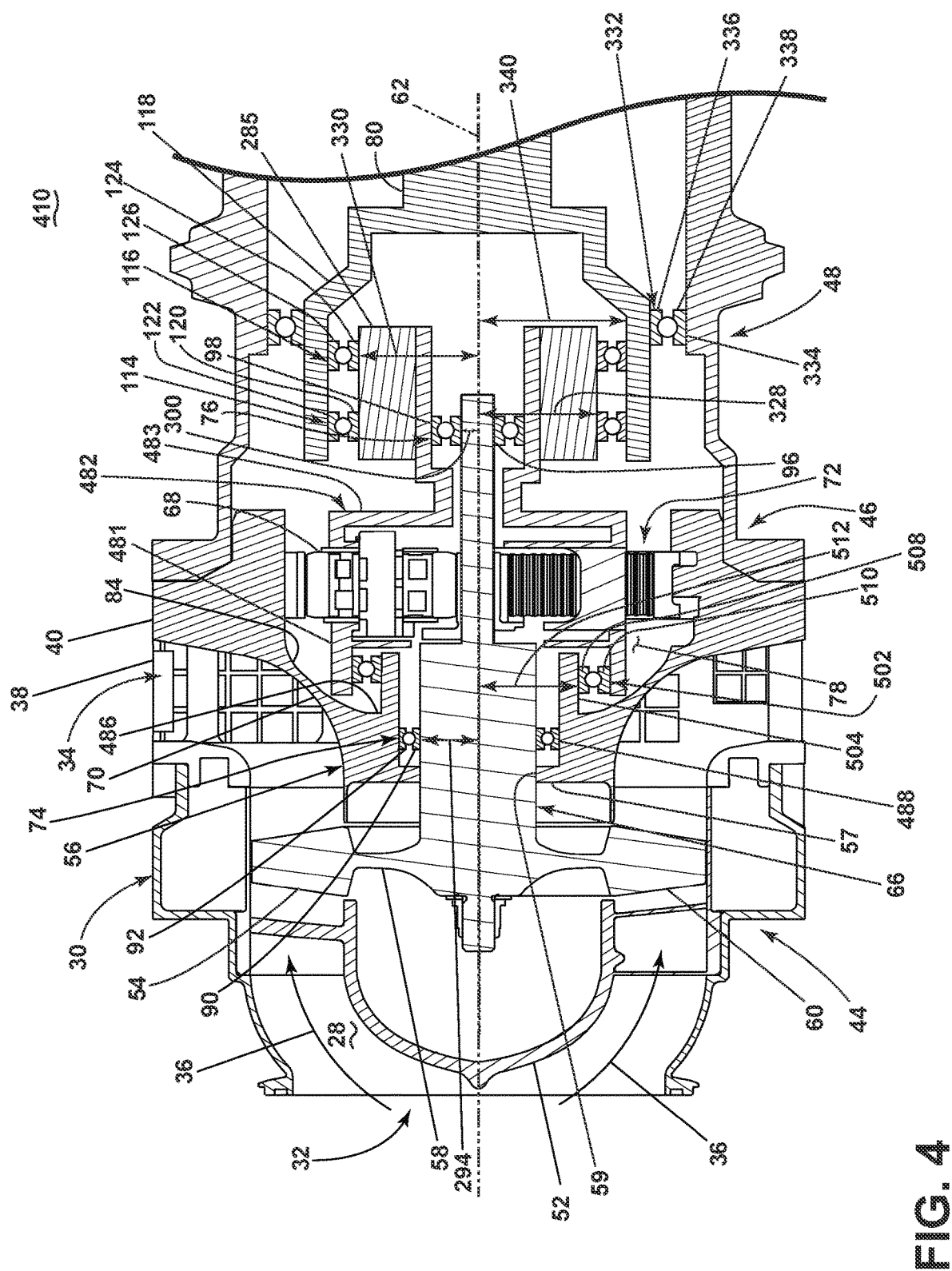
FIG. 4 is another variation of the schematic cross-section of FIG. 2.

FIG. 4 is another example of an air turbine starter 410. The air turbine starter 410 is similar to the air turbine starter 10, 210 therefore, like parts will be identified with like numerals further increased by 200, with it being understood that the description of the like parts of the air turbine starter 10, 210 apply to the air turbine starter 410, unless otherwise noted.

Generally, the air turbine starter 410 includes the housing 30 defining the interior 28 having the primary inlet 32 and the primary outlet 34. The primary air flow path 36, illustrated schematically with an arrow, extends between the primary inlet 32 and the primary outlet 34 for communicating a flow of fluid, including, but not limited to gas, compressed air, or the like, there through. The primary outlet 34 can include the plurality of circumferentially arranged openings 38 in the peripheral wall 40 of the housing 30. In this configuration, the primary inlet 32 is an axial inlet and the primary outlet 34 is a radial or circumferential outlet alone the periphery of the housing 30.

The housing 30 can include, in an axial series arrangement, the inlet turbine section 44, the gearbox section 46, and the drive section 48. The seal structure 56 can be coupled to or unitarily formed with the housing 30. It is contemplated that the seal structure 56 can divide the interior 28 into the inlet turbine section 44 and the gearbox section 46.

The inlet turbine section 44 can include the primary inlet 32, stationary portions 52, the turbine 54, the primary outlet 34, and at least a portion of the seal structure 56. The stationary portions 52 can guide air from the primary inlet 32 to the turbine 54 by defining at least a portion of the primary air flow path 36.

The turbine 54 can include the disc or rotor 58 and the plurality of circumferentially spaced blades 60. The turbine 54, the rotor 58, and the plurality of circumferentially spaced blades 60 can rotate about the centerline or axis of rotation 62.

The turbine 54 can further include the drive shaft 66. The drive shaft 66 can be coupled to or is unitarily formed with the rotor 58 of the turbine 54 allowing for the transfer of energy from air in the primary air flow path 36 to mechanical power. The drive shaft 66 can extend through at least a portion of the inlet turbine section 44 or the gearbox section 46.

The seal structure 56 can define a portion of the primary air flow path 36. By way non-limiting example, the forward wall 70 of the seal structure 56 can guide air from the turbine 54 to the primary outlet 34. The seal structure 56 can include the structural wall 57 that bears the seal 59. The seal 59 can be proved between the structural wall 57 and the drive shaft 66.

The rear wall 84 and a central wall 486 of the seal structure 56 can define a portion of the first cavity 78. The first cavity 78 can be a wet portion of the housing 30. That is, the turbine thrust bearing or first bearing assembly 74 or the turbine pre-load bearing or second bearing assembly 76 can be lubricated with a grease or oil in the first cavity 78 of the housing 30. The first cavity 78 is a portion in the housing 30 that is exposed to grease, oil, or other know coolants or liquids.

By way of non-limiting example, the drive shaft 66 can couple the turbine 54 to one or more gears or clutch assemblies, such as the gear train 68, in the gearbox section 46. The gearbox section 46 can include at least the gear box 72 that can include the gear train 68, the first bearing assembly 74, the second bearing assembly 76, the first cavity 78, and the output shaft 80. The gear box 72 can contain the gear train 68 that couples the drive shaft 66 to the output shaft 80, so that when driven by the drive shaft 66, the gear train 68 can transfer mechanical power to the output shaft 80. The gear train 68 can, for example, be a planetary gear system with a sun gear, a ring gear, and planet gears, which are supported by a carrier 482. The carrier 482 can include an upstream carrier portion 481 and a downstream carrier portion 483. The upstream carrier portion 481 extends axially from the gear train 68 in the upstream direction towards the turbine 54. The downstream carrier portion 483 extends axially from the gear train 68 in the downstream direction towards the output shaft 80 or downstream from the gear train 68. Any gear train 68 having the carrier 482 or similar structure that operably couples the drive shaft 66 to the output shaft 80 is contemplated.

The first bearing assembly 74 can rotationally support the drive shaft 66 to one of the housing 30 or seal structure 56. As illustrated, by way of non-limiting example, the first bearing assembly 74 is positioned between a first portion 488 of the central wall 486 of the seal structure 56 and the drive shaft 66. That is, the first bearing assembly 74 can be circumscribed by the first portion 88 of the seal structure 56 where the first bearing assembly 74 rotatably supports the drive shaft 66 relative to the seal structure 56. The first bearing assembly 74 can include the first bearing inner race 90 and the first bearing outer race 92, with rollers located between the races. The first bearing inner race 90 can rotate with the drive shaft 66, while the first bearing outer races 92 can be fixed relative the seal structure 56 or the housing 30. A first radial distance 294 can be defined as the perpendicular distance from the axis of rotation 62 the first inner portion or the first bearing inner race 90.

Axially, the first bearing assembly 74 can be located between the rotor 58 and the gear train 68. That is, the first bearing assembly 74 can be downstream of the rotor 58 and upstream of the gear box 72 or gear train 68. It is contemplated that the first bearing assembly 74 is fluidly coupled to the first cavity 78. It is further contemplated that the first bearing assembly 74 can be lubricated using any number of systems.

The second bearing assembly 76 can rotationally support at least one of the carrier 482 or output shaft 80 relative to at least one of the drive shaft 66 or housing 30. As illustrated, by way of non-limiting example, the second bearing assembly 76 rotatably supports the downstream carrier portion 483 relative to the drive shaft 66. That is, the second bearing assembly 76 can be radially located between the drive shaft 66 and the downstream carrier portion 483. The second bearing assembly 76 can be circumscribed by the downstream carrier portion 483 of the carrier 482 and rotationally support both the carrier 482 and the drive shaft 66.

The second bearing assembly 76 pre-loads or takes some of the load from the first bearing assembly 74. Pre-loading the first bearing assembly 74 can reduce the operating temperature of the first bearing assembly 74 which improves performance and life of the first bearing assembly 74.

The first and second bearing assemblies 74, 76 provide the saddle mount for the drive shaft 66. That is, there is at least one bearing assembly rotatably supporting the drive shaft 66 on each side of the gear box 72. The saddle mount results in better alignment of the drive shaft 66 in the first bearing assembly 74 or thrust bearing. The saddle mount also provides better radial alignment of the drive shaft 66 in the second bearing assembly 76 and the gear train 68. Further, the saddle mount also allows for a shorter axial length of the air turbine starter 410, as only the first bearing assembly 74, is located upstream of the gear box 72.

The second bearing assembly 76 can include the second bearing inner race 96 and the second bearing outer race 98, with rollers located between the races. As illustrated, the second bearing inner race 96 can rotate with the drive shaft 66. The second bearing outer race 98 can rotate with the downstream carrier portion 483. That is, the second bearing inner and outer races 96, 98 can both rotate. A second radial distance 300 can be defined as the perpendicular distance from the axis of rotation 62 to an inner portion or the second bearing inner race 96. The first radial distance 294 can be greater than or equal to the second radial distance 300. However, it is contemplated that the first radial distance 294 can be less than the second radial distance 300.

The second bearing assembly 76 can be axially located downstream of the gear box 72 or gear train 68. It is contemplated that the second bearing assembly 76 is fluidly coupled to the first cavity 78. Additionally, or alternatively, it is contemplated that the second bearing assembly 76 can be lubricated using any number of systems.

A carrier thrust bearing or third bearing assembly 502 can be included in the air turbine starter 410. The third bearing assembly 502 can rotatably support the carrier 482. As illustrated by way of non-limiting example, the third bearing assembly 502 is illustrated as rotatably supporting the upstream carrier portion 481 relative to a second portion 504 of the housing 30. That is, the third bearing assembly 502 can be radially located between the upstream carrier portion 481 of the carrier 482 and the second portion 504 the housing 30.

The third bearing assembly 502 can include a third bearing inner race 508 and a third bearing outer race 510, with rollers located between the races. As illustrated, the third bearing inner race 508 can rotate with the upstream carrier portion 481. The third bearing outer races 510 can be fixed relative the housing 30 at the second position 504. A third radial distance 512 can be defined as the perpendicular distance from the axis of rotation 62 to an inner portion or the third bearing inner race 508. The third radial distance 512 can be greater than the first radial distance 294 or the second radial distance 300. However, it is contemplated that the third radial distance 512 can be less than or equal to the first radial distance 294 or the second radial distance 300.

The third bearing assembly 502 can be axially located upstream of the gear train 68. It is contemplated that the third bearing assembly 502 is fluidly coupled to the first cavity 78. Additionally, or alternatively, it is contemplated that the third bearing assembly 502 can be lubricated using any number of systems. While illustrated as a single roller, the third bearing assembly 502 can include any number or style of rollers.

The second bearing assembly 76 and the third bearing assembly 502 can provide a saddle mount for the carrier 482, as each of the bearing that rotatably support the carrier 482 are on either side of the gear train 68. This radially improves alignment of the carrier 482 in the gear train 68.

The second bearing assembly 76 or the third bearing assembly 502 can have steel sleeves that mount into aluminum housing which can reduce the weight of the starter 10. Further, the saddle mount for the carrier 482 provided by the second and third bearing assemblies 76, 502 can reduce the overall size of the starter 10. Further, the location of the gear box 72 as provided by the location of the second and third bearing assemblies 76, 502 can allow the gearbox to be positioned closer to the AGB 12, decreasing inertia moments.

The clutch thrust bearing or fourth bearing assembly 114 and the clutch preload bearing or fifth bearing assembly 116 can be included in the air turbine starter 410. The fourth and fifth bearing assemblies 114, 116 can rotatably support the carrier 282 or an engagement structure 285 and a portion of an output arm 118, where the output arm 118 can couple to the output shaft 80. The fourth and fifth bearing assemblies 114, 116 can be axially located downstream of the gear train 68.

The output arm 118 can be selectively coupled to the carrier 482 or engagement structure 285. The engagement structure 285 can be selectively coupled or fixed to the downstream carrier portion 483. That is, any number of assemblies (not shown) or selectable coupling devices or techniques (not shown) are contemplated at the interface of the carrier 482 and the engagement structure 285 or at the interface of the engagement structure 285 and the output arm 118 or output shaft 80.

As illustrated by way of non-limiting example, the fourth and fifth bearing assemblies 114, 116 are illustrated as rotatably supporting the downstream carrier portion 483 and the output arm 118. That is, the fourth and fifth bearing assemblies 114, 116 can be radially located between the downstream carrier portion 283 and the output arm 118.

The fourth and fifth bearing assemblies 114, 116 can include the fourth bearing inner race 120, the fourth bearing outer race 122, the fifth bearing inner race 124 and the fifth bearing outer race 126, with rollers located between the corresponding races. As illustrated, the fourth and fifth bearing inner races 120, 124 can rotate with the downstream carrier portion 483. The fourth and fifth bearing outer races 122, 126 can rotate with the output arm 118. A fourth radial distance 328 can be defined as the perpendicular distance from the axis of rotation 62 to an inner portion or the fourth bearing inner race 120. A fifth radial distance 330 can be defined as the perpendicular distance from the axis of rotation 62 to an inner portion or the fifth bearing inner race 124.

As illustrated, by way of non-limiting example, the fourth and fifth radial distance 328, 330 can be equal. However, it is contemplated that the fourth radial distance 328 can be greater than or less than the fifth radial distance 330.

The fourth and fifth radial distances 328, 330 can be greater than the first radial distance 294, the second radial distance 300, or the third radial distance 512. However, any combination of greater than, less than, or equal to among the first, second, third, fourth, and fifth radial distances 294, 300, 512, 328, 330 is contemplated.

The partial radial alignment of the fourth bearing assembly 114 and the second bearing assembly 76 can help axially align the carrier 482 relative to the gear train 68 and the drive shaft 66. The fifth bearing assembly 116 can preload or a reduce forces on the fourth bearing assembly 114.

A drive preload bearing or sixth bearing assembly 332 can be included in the air turbine starter 410. The sixth bearing assembly 332 can rotatably support the output arm 118. As illustrated by way of non-limiting example, the sixth bearing assembly 332 is illustrated as rotatably supporting the output arm 118 relative to a third portion 334 of the housing 30. The third portion 334 of the housing 30 an be a protrusion, extension, or additional structure(s) coupled to or formed with the housing 30. That is, the sixth bearing assembly 332 can be radially located between the output arm 118 and the third portion 334 of the housing 30. The sixth bearing assembly 332 can be circumscribed by the housing 30 and rotationally support the output arm 118 relative to the housing 30.

The sixth bearing assembly 332 can include a sixth bearing inner race 336 and a sixth bearing outer race 338, with rollers located between the races. As illustrated, the sixth bearing inner race 336 can rotate with the output arm 118. The sixth bearing outer races 338 can be fixed relative the housing 30. A sixth radial distance 340 can be defined as the perpendicular distance from the axis of rotation 62 to an inner portion or the sixth bearing inner race 336. As illustrated, by way of non-limiting example, the sixth radial distance 340 can be greater than the first, second, third, fourth, and fifth radial distances 294, 300, 312, 328, 330, however, any combination is contemplated.

The sixth bearing assembly 332 can be axially located downstream of the gear train 68. While illustrated as a single roller, the sixth bearing assembly 332 can include any number of rollers. While illustrated with six bearing assemblies, it is contemplated that the gearbox section 46 and the drive section 48 of the air turbine starter 410 can include any number of bearing assemblies with any number or style of rollers.

Figure 5:
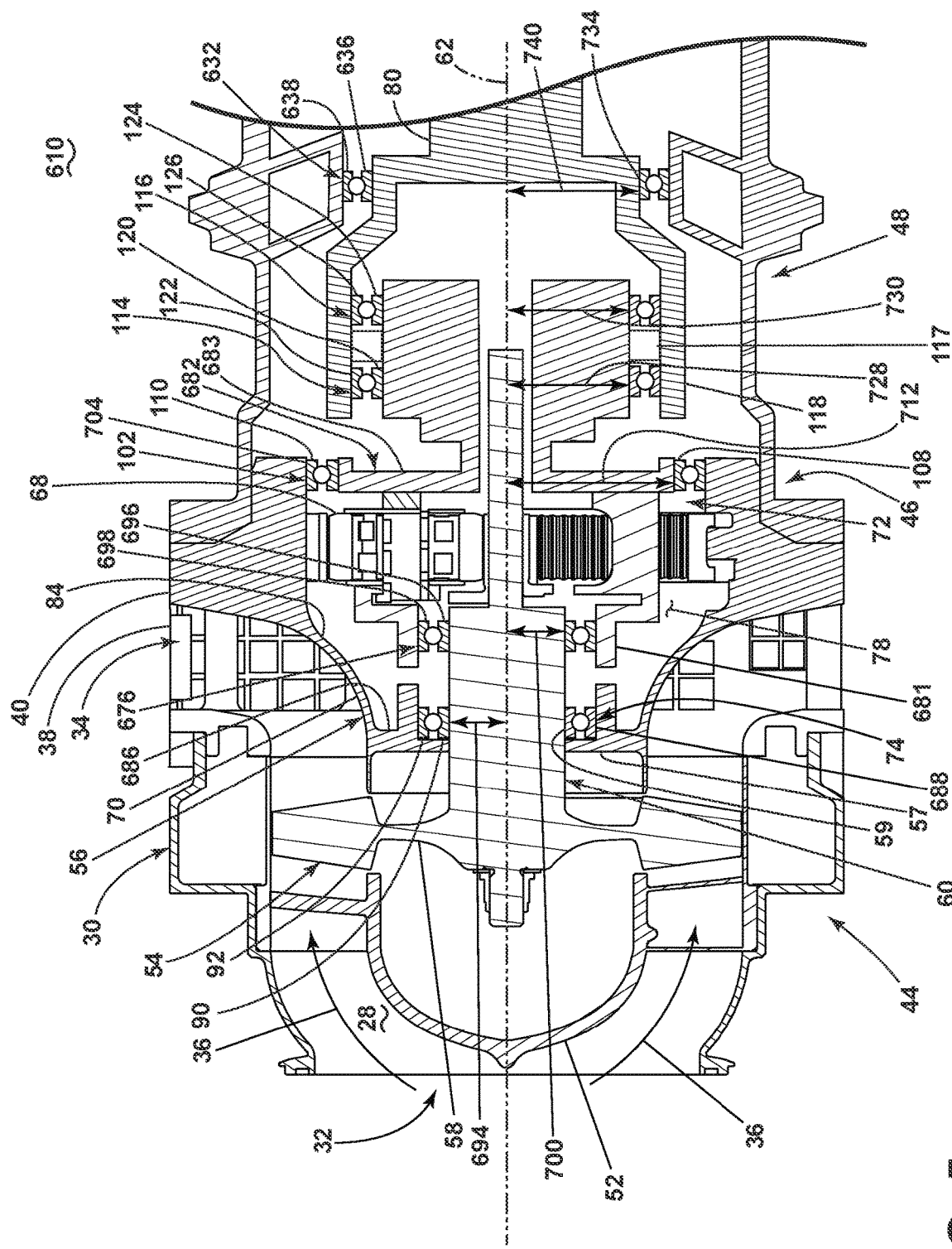
FIG. 5 is yet another variation of the schematic cross-section of FIG. 2.

FIG. 5 is yet another example of an air turbine starter 610. The air turbine starter 610 is similar to the air turbine starter 10, 210, 410 therefore, like parts will be identified with like numerals further increased by 200, with it being understood that the description of the like parts of the air turbine starter 10, 210, 410 apply to the air turbine starter 610, unless otherwise noted.

Generally, the air turbine starter 610 includes the housing 30 defining the interior 28 having the primary inlet 32 and the primary outlet 34. The primary air flow path 36, illustrated schematically with an arrow, extends between the primary inlet 32 and the primary outlet 34 for communicating a flow of fluid, including, but not limited to gas, compressed air, or the like, there through. The primary outlet 34 can include the plurality of circumferentially arranged openings 38 in the peripheral wall 40 of the housing 30. In this configuration, the primary inlet 32 is an axial inlet and the primary outlet 34 is a radial or circumferential outlet alone the periphery of the housing 30.

The housing 30 can include, in an axial series arrangement, the inlet turbine section 44, the gearbox section 46, and the drive section 48. The seal structure 56 can be coupled to or unitarily formed with the housing 30. It is contemplated that the seal structure 56 can divide the interior 28 into the inlet turbine section 44 and the gearbox section 46.

The inlet turbine section 44 can include the primary inlet 32, stationary portions 52, the turbine 54, the primary outlet 34, and at least a portion of the seal structure 56. The stationary portions 52 can guide air from the primary inlet 32 to the turbine 54 by defining at least a portion of the primary air flow path 36.

The turbine 54 can include the disc or rotor 58 and the plurality of circumferentially spaced blades 60. The turbine 54, the rotor 58, and the plurality of circumferentially spaced blades 60 can rotate about the centerline or axis of rotation 62.

The turbine 54 can further include the drive shaft 66. The drive shaft 66 can be coupled to or is unitarily formed with the rotor 58 of the turbine 54 allowing for the transfer of energy from air in the primary air flow path 36 to mechanical power. The drive shaft 66 can extend through at least a portion of the inlet turbine section 44 or the gearbox section 46.

The seal structure 56 can define a portion of the primary air flow path 36. By way non-limiting example, the forward wall 70 of the seal structure 56 can guide air from the turbine 54 to the primary outlet 34. The seal structure 56 can include the structural wall 57 that bears the seal 59. The seal 59 can be proved between the structural wall 57 and the drive shaft 66.

The rear wall 84 and a central wall 686 of the seal structure 56 can define a portion of the first cavity 78. The first cavity 78 can be a wet portion of the housing 30. That is, the turbine thrust bearing or first bearing assembly 74 or a turbine pre-load bearing or second bearing assembly 676 can be lubricated with a grease or oil in the first cavity 78 of the housing 30. The first cavity 78 is a portion in the housing 30 that is exposed to grease, oil, or other know coolants or liquids.

By way of non-limiting example, the drive shaft 66 can couple the turbine 54 to one or more gears or clutch assemblies, such as the gear train 68, in the gearbox section 46. The gearbox section 46 can include at least the gear box 72 that can include the gear train 68, the first bearing assembly 74, the second bearing assembly 676, the first cavity 78, and the output shaft 80. The gear box 72 can contain the gear train 68 that couples the drive shaft 66 to the output shaft 80, so that when driven by the drive shaft 66, the gear train 68 can transfer mechanical power to the output shaft 80. The gear train 68 can, for example, be a planetary gear system with a sun gear, a ring gear, and planet gears, which are supported by a carrier 682. The carrier 682 can include an upstream carrier portion 681 and a downstream carrier portion 683. The upstream carrier portion 681 extends axially from the gear train 68 in the upstream direction towards the turbine 54. The downstream carrier portion 683 extends axially from the gear train 68 in the downstream direction towards the output shaft 80 or downstream from the gear train 68. Any gear train 68 having the carrier 682 or similar structure that operably couples the drive shaft 66 to the output shaft 80 is contemplated.

The first bearing assembly 74 can rotationally support the drive shaft 66 to one of the housing 30 or seal structure 56. As illustrated, by way of non-limiting example, the first bearing assembly 74 is positioned between a first portion 688 of the central wall 686 of the seal structure 56 and the drive shaft 66. That is, the first bearing assembly 74 can be circumscribed by the first portion 688 of the seal structure 56 where the first bearing assembly 74 rotatably supports the drive shaft 66 relative to the seal structure 56. The first bearing assembly 74 can include the first bearing inner race 90 and the first bearing outer race 92, with rollers located between the races. The first bearing inner race 90 can rotate with the drive shaft 66, while the first bearing outer races 92 can be fixed relative the seal structure 56 or the housing 30. A first radial distance 694 can be defined as the perpendicular distance from the axis of rotation 62 the first inner portion or the first bearing inner race 90.

Axially, the first bearing assembly 74 can be located between the rotor 58 and the gear train 68. That is, the first bearing assembly 74 can be downstream of the rotor 58 and upstream of the gear box 72 or gear train 68. It is contemplated that the first bearing assembly 74 is fluidly coupled to the first cavity 78. It is further contemplated that the first bearing assembly 74 can be lubricated using any number of systems.

The second bearing assembly 676 can rotationally support at least one of the carrier 682 or output shaft 80 relative to at least one of the drive shaft 66 or housing 30. As illustrated, by way of non-limiting example, the second bearing assembly 676 rotatably supports the upstream carrier portion 681 relative to the drive shaft 66. That is, the second bearing assembly 676 can be radially located between the drive shaft 66 and the upstream carrier portion 681 of the carrier 682. The second bearing assembly 676 can be circumscribed by the upstream carrier portion 681 of the carrier 682 and rotationally support both the carrier 682 and the drive shaft 66.

The second bearing assembly 676 pre-loads or takes some of the load from the first bearing assembly 74. Pre-loading the first bearing assembly 74 can reduce the operating temperature of the first bearing assembly 74 which improves performance and life of the first bearing assembly 74.

The second bearing assembly 676 can include a second bearing inner race 696 and a second bearing outer race 698, with rollers located between the races. As illustrated, the second bearing inner race 696 can rotate with the drive shaft 66. The second bearing outer race 698 can rotate with the upstream carrier portion 681. That is, the second bearing inner and outer races 696, 698 can both rotate. A second radial distance 700 can be defined as the perpendicular distance from the axis of rotation 62 to an inner portion or the second bearing inner race 696. The first radial distance 694 can be equal to the second radial distance 700. However, it is contemplated that the first radial distance 694 can be less than or greater than the second radial distance 700.

The second bearing assembly 676 can be axially located upstream of the gear box 72 or gear train 68. It is contemplated that the second bearing assembly 676 is fluidly coupled to the first cavity 78. Additionally, or alternatively, it is contemplated that the second bearing assembly 676 can be lubricated using any number of systems.

The carrier thrust bearing or third bearing assembly 102 can be included in the air turbine starter 610. The third bearing assembly 102 can rotatably support the carrier 682. As illustrated by way of non-limiting example, the third bearing assembly 102 is illustrated as rotatably supporting the downstream carrier portion 683 relative to a second position or a second portion 704 of the housing 30. That is, the third bearing assembly 102 can be radially located between the downstream carrier portion 683 of the carrier 682 and the second portion 704 the housing 30.

The third bearing assembly 102 can include the third bearing inner race 108 and the third bearing outer race 110, with rollers located between the races. As illustrated, the third bearing inner race 108 can rotate with the downstream carrier portion 683. The third bearing outer races 110 can be fixed relative the housing 30 at the second portion 704. A third radial distance 712 can be defined as the perpendicular distance from the axis of rotation 62 to an inner portion or the third bearing inner race 108. The third radial distance 712 can be greater than the first radial distance 694 or the second radial distance 700. However, it is contemplated that the third radial distance 712 can be less than or equal to the first radial distance 694 or the second radial distance 700.

The third bearing assembly 102 can be axially located downstream of the gear train 68. It is contemplated that the third bearing assembly 102 is fluidly coupled to the first cavity 78. Additionally, or alternatively, it is contemplated that the third bearing assembly 102 can be lubricated using any number of systems. While illustrated as a single roller, the third bearing assembly 102 can include any number or style of rollers.

The second bearing assembly 676 and the third bearing assembly 102 can provide a saddle mount for the carrier 682, as each of the bearing that rotatably support the carrier 682 are on either side of the gear train 68. This radially improves alignment of the carrier 682 in the gear train 68.

The clutch thrust bearing or fourth bearing assembly 114 and the clutch preload bearing or fifth bearing assembly 116 can be included in the air turbine starter 610. The fourth and fifth bearing assemblies 114, 116 can rotatably support the carrier 682. The fourth and fifth bearing assemblies 114, 116 can be axially located downstream of the gear train 68.

One or more portions of the clutch assembly 117 can be located between the fourth and fifth bearing assemblies 114, 116. However, it is contemplated that one or more portions of the clutch assembly 117 can located upstream of the fourth bearing assembly 114 or downstream of the fifth bearing assembly 116. The clutch assembly 117 can selectively engage the carrier 682 and the output shaft 80 or output arm 118. The fourth and fifth bearing assemblies 114, 116 can provide axial or radial stabilization for the clutch assembly 117.

The output arm 118 can be selectively coupled to the carrier 682 via the clutch assembly 117. The clutch assembly 117 is schematically illustrated and any number of assemblies (not shown) or selectable coupling devices or techniques (not shown) are contemplated at the interface of the carrier 682 and the output arm 118 or output shaft 80.

As illustrated by way of non-limiting example, the fourth and fifth bearing assemblies 114, 116 are illustrated as rotatably supporting the downstream carrier portion 683 and the output arm 118. That is, the fourth and fifth bearing assemblies 114, 116 can be radially located between the downstream carrier portion 683 and the output arm 118.

The fourth and fifth bearing assemblies 114, 116 can include the fourth bearing inner race 120, the fourth bearing outer race 122, the fifth bearing inner race 124 and the fifth bearing outer race 126, with rollers located between the corresponding races. As illustrated, the fourth and fifth bearing inner races 120, 124 can rotate with the downstream carrier portion 683. The fourth and fifth bearing outer races 122, 126 can rotate with the output arm 118. A fourth radial distance 728 can be defined as the perpendicular distance from the axis of rotation 62 to an inner portion or the fourth bearing inner race 120. A fifth radial distance 730 can be defined as the perpendicular distance from the axis of rotation 62 to an inner portion or the fifth bearing inner race 124.

As illustrated, by way of non-limiting example, the fourth and fifth radial distance 728, 730 can be equal. However, it is contemplated that the fourth radial distance 728 can be greater than or less than the fifth radial distance 730.

The fourth and fifth radial distances 728, 730 can be greater than the first radial distance 694 or the second radial distance 700 and less than the third radial distance 712. However, any combination of greater than, less than, or equal to among the first, second, third, fourth, and fifth radial distances 694, 700, 712, 728, 730 is contemplated.

The fifth bearing assembly 116 can preload or a reduce forces on the fourth bearing assembly 114. Further, the fourth and fifth bearing assemblies 114, 116 can provide radial alignment and stability to the output shaft 80 about the axis of rotation 62. The axial spacing between the fourth and fifth bearing assemblies 114, 116 provides radial support for the carrier 682. Additionally, or alternatively, the fourth and fifth bearing assemblies 114, 116 can provide axial or radial support for the clutch assembly 117.

A drive preload bearing or sixth bearing assembly 632 can be included in the air turbine starter 610. The sixth bearing assembly 632 can rotatably support the output arm 118. As illustrated by way of non-limiting example, the sixth bearing assembly 632 is illustrated as rotatably supporting the output arm 118 relative to a third portion 734 of the housing 30. The third portion 734 of the housing 30 an be a protrusion, extension, or additional structure(s) coupled to or formed with the housing 30. That is, the sixth bearing assembly 632 can be radially located between the output arm 118 and the third portion 734 of the housing 30. The sixth bearing assembly 632 can be circumscribed by the housing 30 and rotationally support the output arm 118 relative to the housing 30.

The sixth bearing assembly 632 can include the sixth bearing inner race 636 and the sixth bearing outer race 638, with rollers located between the races. As illustrated, the sixth bearing inner race 636 can rotate with the output arm 118. The sixth bearing outer races 638 can be fixed relative the housing 30. A sixth radial distance 740 can be defined as the perpendicular distance from the axis of rotation 62 to an inner portion or the sixth bearing inner race 636. As illustrated, by way of non-limiting example, the sixth radial distance 740 can be greater than the first, second, fourth, and fifth radial distances 694, 700, 728, 730, and less than the third radial distance 712, however, any combination is contemplated.

The sixth bearing assembly 632 can be axially located downstream of the gear train 68. The sixth bearing assembly 632 can provide support provided to the carrier 682 to reduce vibrations of the carrier 682. While illustrated with six bearing assemblies, it is contemplated that the gearbox section 46 and the drive section 48 of the air turbine starter 610 can include any number of bearing assemblies with any number or style of rollers.

Figure 6:
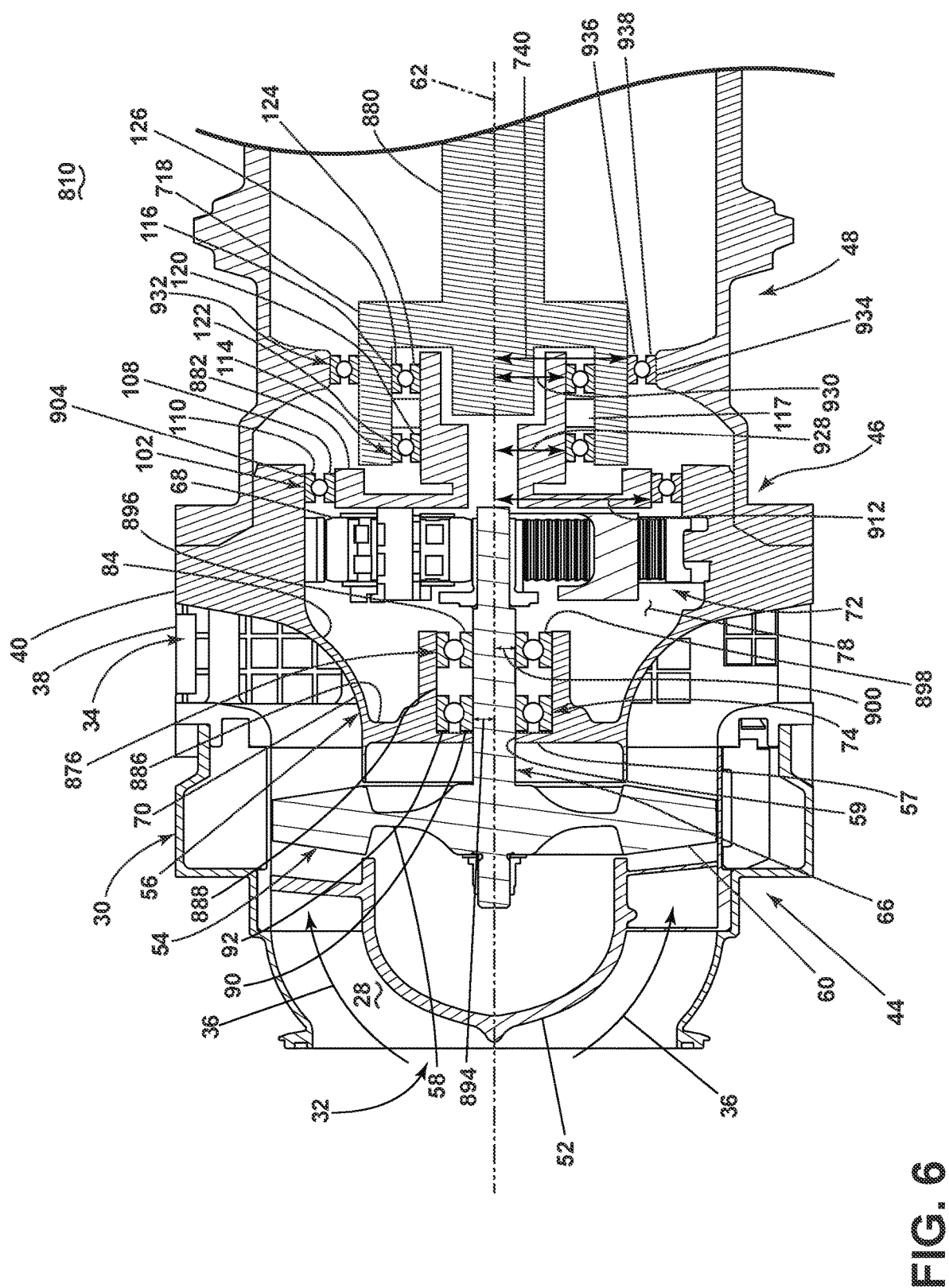
FIG. 6 is still yet another variation of the schematic cross-section of FIG. 2.

FIG. 6 is still yet another example of an air turbine starter 810. The air turbine starter 810 is similar to the air turbine starter 10, 210, 410, 610 therefore, like parts will be identified with like numerals further increased by 200, with it being understood that the description of the like parts of the air turbine starter 10, 210, 410, 610 apply to the air turbine starter 810, unless otherwise noted.

Generally, the air turbine starter 810 includes the housing 30 defining the interior 28 having the primary inlet 32 and the primary outlet 34. The primary air flow path 36, illustrated schematically with an arrow, extends between the primary inlet 32 and the primary outlet 34 for communicating a flow of fluid, including, but not limited to gas, compressed air, or the like, there through. The primary outlet 34 can include the plurality of circumferentially arranged openings 38 in the peripheral wall 40 of the housing 30. In this configuration, the primary inlet 32 is an axial inlet and the primary outlet 34 is a radial or circumferential outlet alone the periphery of the housing 30.

The housing 30 can include, in an axial series arrangement, the inlet turbine section 44, the gearbox section 46, and the drive section 48. The seal structure 56 can be coupled to or unitarily formed with the housing 30. It is contemplated that the seal structure 56 can divide the interior 28 into the inlet turbine section 44 and the gearbox section 46.

The inlet turbine section 44 can include the primary inlet 32, stationary portions 52, the turbine 54, the primary outlet 34, and at least a portion of the seal structure 56. The stationary portions 52 can guide air from the primary inlet 32 to the turbine 54 by defining at least a portion of the primary air flow path 36.

The turbine 54 can include the disc or rotor 58 and the plurality of circumferentially spaced blades 60. The turbine 54, the rotor 58, and the plurality of circumferentially spaced blades 60 can rotate about the centerline or axis of rotation 62.

The turbine 54 can further include the drive shaft 66. The drive shaft 66 can be coupled to or is unitarily formed with the rotor 58 of the turbine 54 allowing for the transfer of energy from air in the primary air flow path 36 to mechanical power. The drive shaft 66 can extend through at least a portion of the inlet turbine section 44 or the gearbox section 46.

The seal structure 56 can define a portion of the primary air flow path 36. By way non-limiting example, the forward wall 70 of the seal structure 56 can guide air from the turbine 54 to the primary outlet 34. The seal structure 56 can include the structural wall 57 that bears the seal 59. The seal 59 can be proved between the structural wall 57 and the drive shaft 66.

The rear wall 84 and a central wall 886 of the seal structure 56 can define a portion of the first cavity 78. The first cavity 78 can be a wet portion of the housing 30. That is, the turbine thrust bearing or first bearing assembly 74 or a turbine pre-load bearing or second bearing assembly 876 can be lubricated with a grease or oil in the first cavity 78 of the housing 30. The first cavity 78 is a portion in the housing 30 that is exposed to grease, oil, or other know coolants or liquids.

By way of non-limiting example, the drive shaft 66 can couple the turbine 54 to one or more gears or clutch assemblies, such as the gear train 68, in the gearbox section 46. The gearbox section 46 can include at least the gear box 72 that can include the gear train 68, the first bearing assembly 74, the second bearing assembly 876, the first cavity 78, and the output shaft 80. The gear box 72 can contain the gear train 68 that couples the drive shaft 66 to the output shaft 80, so that when driven by the drive shaft 66, the gear train 68 can transfer mechanical power to the output shaft 80. The gear train 68 can, for example, be a planetary gear system with a sun gear, a ring gear, and planet gears, which are supported by a carrier 882. The carrier 882 extends axially from the gear train 68 in the downstream direction towards the output shaft 80. Any gear train 68 having the carrier 882 or similar structure that operably couples the drive shaft 66 to the output shaft 80 is contemplated.

The first bearing assembly 74 or the second bearing assembly 876 can rotationally support the drive shaft 66 to one of the housing 30 or seal structure 56. As illustrated, by way of non-limiting example, the first bearing assembly 74 and the second bearing assembly 876 are positioned between a first portion 888 of the central wall 886 of the seal structure 56 and the drive shaft 66. That is, the first bearing assembly 74 and the second bearing assembly 876 can be circumscribed by the first portion 888 of the seal structure 56 where the first bearing assembly 74 and the second bearing assembly 876 rotatably supports the drive shaft 66 relative to the seal structure 56.

The first bearing assembly 74 can include the first bearing inner race 90 and the first bearing outer race 92, with rollers located between the races. The first bearing inner race 90 can rotate with the drive shaft 66, while the first bearing outer races 92 can be fixed relative the seal structure 56 or the housing 30. A first radial distance 894 can be defined as the perpendicular distance from the axis of rotation 62 the first inner portion or the first bearing inner race 90.

The second bearing assembly 876 can include a second bearing inner race 896 and a second bearing outer race 898, with rollers located between the races. The second bearing inner race 896 can rotate with the drive shaft 66, while the second bearing outer races 898 can be fixed relative the seal structure 56 or the housing 30. A second radial distance 900 can be defined as the perpendicular distance from the axis of rotation 62 the second inner portion or the second bearing inner race 896.

Axially, the first and second bearing assemblies 74, 876 can be located between the rotor 58 and the gear train 68. That is, the first bearing assembly 74 and second bearing assembly 876 can be downstream of the rotor 58 and upstream of the gear box 72 or gear train 68. It is contemplated that the first bearing assembly 74 and the second bearing assembly 876 are fluidly coupled to the first cavity 78. It is further contemplated that the first bearing assembly 74 or the second bearing assembly 876 can be lubricated using any number of systems.

The carrier thrust bearing or third bearing assembly 102 can be included in the air turbine starter 810. The third bearing assembly 102 can rotatably support the carrier 882. As illustrated by way of non-limiting example, the third bearing assembly 102 is illustrated as rotatably supporting the carrier 882 relative to a second position or a second portion 904 of the housing 30. That is, the third bearing assembly 102 can be radially located between the carrier 882 and the second portion 904 the housing 30.

The third bearing assembly 102 can include the third bearing inner race 108 and the third bearing outer race 110, with rollers located between the races. As illustrated, the third bearing inner race 108 can rotate with the carrier 882. The third bearing outer races 110 can be fixed relative the housing 30 at the second portion 904. A third radial distance 912 can be defined as the perpendicular distance from the axis of rotation 62 to an inner portion or the third bearing inner race 108. The third radial distance 912 can be greater than the first radial distance 894 or the second radial distance 900. However, it is contemplated that the third radial distance 912 can be less than or equal to the first radial distance 894 or the second radial distance 900.

The third bearing assembly 102 can be axially located downstream of the gear train 68. It is contemplated that the third bearing assembly 102 is fluidly coupled to the first cavity 78. Additionally, or alternatively, it is contemplated that the third bearing assembly 102 can be lubricated using any number of systems. While illustrated as a single roller, the third bearing assembly 102 can include any number or style of rollers. The third bearing assembly 102 can help center or axially locate at least a portion of the gear box 72.

The clutch thrust bearing or fourth bearing assembly 114 and the clutch preload bearing or fifth bearing assembly 116 can be included in the air turbine starter 810. The fourth and fifth bearing assemblies 114, 116 can rotatably support the carrier 882 and a portion of an output arm 718, where the output arm 718 can couple to an output shaft 880. The fourth and fifth bearing assemblies 114, 116 can be axially located downstream of the gear train 68.

One or more portions of the clutch assembly 117 can be located between the fourth and fifth bearing assemblies 114, 116. However, it is contemplated that one or more portions of the clutch assembly 117 can located upstream of the fourth bearing assembly 114 or downstream of the fifth bearing assembly 116. The clutch assembly 117 can selectively engage the carrier 882 and the output arm 718 or the output shaft 880. The fourth and fifth bearing assemblies 114, 116 can provide axial or radial stabilization for the clutch assembly 117.

The output arm 718 can be selectively coupled to the carrier 882. That is, any number of assemblies (not shown) or selectable coupling devices or techniques (not shown) are contemplated at the interface of the carrier 882 and the output arm 718 or output shaft 880.

As illustrated by way of non-limiting example, the fourth and fifth bearing assemblies 114, 116 are illustrated as rotatably supporting the carrier 882 and the output arm 718. That is, the fourth and fifth bearing assemblies 114, 116 can be radially located between the carrier 882 and the output arm 718.

The fourth and fifth bearing assemblies 114, 116 can include the fourth bearing inner race 120, the fourth bearing outer race 122, the fifth bearing inner race 124 and the fifth bearing outer race 126, with rollers located between the corresponding races. As illustrated, the fourth and fifth bearing inner races 120, 124 can rotate with the carrier 882. The fourth and fifth bearing outer races 122, 126 can rotate with the output arm 718. A fourth radial distance 928 can be defined as the perpendicular distance from the axis of rotation 62 to an inner portion or the fourth bearing inner race 120. A fifth radial distance 930 can be defined as the perpendicular distance from the axis of rotation 62 to an inner portion or the fifth bearing inner race 124.

As illustrated, by way of non-limiting example, the fourth and fifth radial distance 928, 930 can be equal. However, it is contemplated that the fourth radial distance 928 can be greater than or less than the fifth radial distance 930.

The fourth and fifth radial distances 928, 930 can be greater than a first radial distance 894 or a second radial distance 900 and less than the third radial distance 912. However, any combination of greater than, less than, or equal to among the first, second, third, fourth, and fifth radial distances 894, 900, 912, 928, 930 is contemplated.

The fifth bearing assembly 116 can preload or a reduce forces on the fourth bearing assembly 114.

The drive preload bearing or sixth bearing assembly 932 can be included in the air turbine starter 810. The sixth bearing assembly 932 can rotatably support the output arm 718. As illustrated by way of non-limiting example, the sixth bearing assembly 932 is illustrated as rotatably supporting the output arm 718 relative to a third portion 934 of the housing 30. The third portion 934 of the housing 30 an be a protrusion, extension, or additional structure(s) coupled to or formed with the housing 30. That is, the sixth bearing assembly 932 can be radially located between the output arm 718 and the third portion 934 of the housing 30. The sixth bearing assembly 932 can be circumscribed by the housing 30 and rotationally support the output arm 718 relative to the housing 30.

The sixth bearing assembly 932 can include a sixth bearing inner race 936 and a sixth bearing outer race 938, with rollers located between the races. As illustrated, the sixth bearing inner race 936 can rotate with the output arm 718. The sixth bearing outer races 938 can be fixed relative the housing 30. A sixth radial distance 740 can be defined as the perpendicular distance from the axis of rotation 62 to an inner portion or the sixth bearing inner race 936. As illustrated, by way of non-limiting example, the sixth radial distance 740 can be greater than the first, second, fourth, and fifth radial distances 894, 900, 928, 930, and less than the third radial distance 912, however, any combination is contemplated.

The sixth bearing assembly 932 can be axially located downstream of the gear train 68. While illustrated with six bearing assemblies, it is contemplated that the gearbox section 46 and the drive section 48 of the air turbine starter 810 can include any number of bearing assemblies with any number or style of rollers.

The sixth bearing assembly 932 can axially align with at least a portion of the fifth bearing assembly 116. That is, at least a portion of the sixth bearing assembly 932 can circumscribe at least a portion of the fifth bearing assembly 116. The axial overlap can provide increased stability in the axial direction for at least the output arm 718. The axial overlap can provide radial stability to the output shaft 880. Further, the sixth bearing assembly 932 can be part of a combination of bearing assemblies that center the gear box 72.

Benefits associated with aspects of the disclosure herein include a reduced load to the first bearing assembly or thrust bearing. The second bearing assembly, especially when located downstream of the gear train, can help to radially align the drive shaft. The first and second bearing assemblies provide a saddle mount for the drive shaft; that is, there is at least one bearing rotatably supporting the drive shaft on each side of the gear box. This results in better alignment of the drive shaft in the first bearing assembly or thrust bearing, can reduce the axial load, and therefore the temperature of the first bearing assembly. The temperature of the bearings is often one of the limiting factors in determining the length of time the air turbine starter can operate before requiring cool down time. Aspects of the present disclosure reduce the temperature of the bearings during motoring, which increases the amount of time the air turbine starter can operate. Longer operation of the air turbine starter allows for multiple attempts at firing the turbine engine from the air turbine starter before requiring a cool down period for the air turbine starter. The saddle mount can also provide better alignment of the drive shaft in the gear box.

Additional benefits include a longer part life due to increased cooling of the parts. Aspects of the present disclosure provide a reduced thermal load on the first bearing assembly or thrust bearing of the air turbine starter.

Further, benefits include improved lubrication of the first bearing assembly or thrust bearing as lubrication from the first cavity can easily enter or splash the first bearing assembly or thrust bearing of the air turbine starter.

Further, additional benefits can include a decrease in the size of the air turbine starter. The location of the bearing assemblies can allow for a smaller air turbine starter. Specifically, when only one bearing assembly is required upstream of the gear box, this allows for the diameter and/or the axial length of the air turbine starter to be smaller than a configuration with two bearing assemblies upstream of the gear box.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

1. An air turbine starter comprising a housing having a primary inlet and primary outlet to define a primary air flow path from the primary inlet to the primary outlet, a gear box located within a gearbox section and having a drive shaft and an output shaft, with a gear train, including a carrier, operably coupling the drive shaft and the output shaft, a turbine having a rotor coupled to the drive shaft and a plurality of circumferentially spaced blades extending from the rotor, a first bearing assembly rotatably supporting the drive shaft relative to the housing, and a second bearing assembly rotatably supporting at least one of the carrier or the output shaft relative to at least one of the drive shaft or housing.

2. The air turbine starter of any of the preceding clauses, wherein the first bearing assembly is axially located between the rotor and the gear train.

3. The air turbine starter of any of the preceding clauses, wherein the second bearing assembly is axially located downstream of the gear box.

4. The air turbine starter of any of the preceding clauses, wherein the first bearing assembly is located at a first radial distance and the second bearing assembly is located at a second radial distance, wherein the first radial distance is greater than or equal to the second radial distance.

5. The air turbine starter of any of the preceding clauses further including a third bearing assembly configured to rotatably support the carrier and located between the carrier and a second portion of the housing.

6. The air turbine starter of any of the preceding clauses, wherein the third bearing assembly is located at a third radial distance that is greater than the second radial distance.

7. The air turbine starter of any of the preceding clauses wherein the third bearing assembly is axially located downstream of the gear train.

8. The air turbine starter of any of the preceding clauses, wherein at least a portion of the third bearing assembly circumscribes at least a portion of the second bearing assembly.

9. The air turbine starter of any of the preceding clauses, wherein the third bearing assembly is axially located between the rotor and the gear train.

10. The air turbine starter of any of the preceding clauses, wherein the second bearing assembly is axially located between the rotor and the gear train.

11. The air turbine starter of any of the preceding clauses further including a third bearing assembly configured to rotatably support the carrier and located between the carrier and a second portion of the housing.

12. The air turbine starter of any of the preceding clauses, wherein the third bearing assembly is located at a third radial distance and the second bearing assembly is located at a second radial distance that is less than the third radial distance.

13. The air turbine starter of any of the preceding clauses further comprising a seal dividing an interior of the housing into a turbine section and the gearbox section.

14. An air turbine starter comprising a housing defining an interior having a primary inlet and a primary outlet to define a primary air flow path from the primary inlet to the primary outlet, a turbine located in the interior that includes a rotor with a plurality of circumferentially spaced blades that extend into the primary air flow path, a drive shaft operably coupled with the turbine, a gear box located in the interior and including a gear train coupled to the drive shaft, a first bearing assembly configured to rotatably support the drive shaft and located between the drive shaft and a first portion of the housing, a second bearing assembly configured to rotatably support a carrier coupled to the gear train, and a third bearing assembly configured to rotatably support the carrier and located between the carrier and a second portion of the housing.

15. The air turbine starter of any of the preceding clauses, wherein the first bearing assembly is axially located between the rotor and the gear train.

16. The air turbine starter of any of the preceding clauses, wherein the second bearing assembly is axially located downstream of the gear box.

17. The air turbine starter of any of the preceding clauses further including a sixth bearing assembly configured to rotatably support an output arm or output shaft relative to a third portion of the housing.

18. The air turbine starter of any of the preceding clauses, wherein at least a portion of the third bearing assembly circumscribes at least a portion of the second bearing assembly.

19. The air turbine starter of any of the preceding clauses, wherein the first bearing assembly is located at a first radial distance and the second bearing assembly is located at a second radial distance, wherein the first radial distance is greater than or equal to the second radial distance.

20. The air turbine starter of any of the preceding clauses, wherein the second bearing assembly is located at a second radial distance and the third bearing assembly is located at a third radial distance, wherein the second radial distance is less than the third radial distance.

What is claimed is:

1. An air turbine starter comprising:
a housing having a primary inlet and primary outlet to define a primary air flow path from the primary inlet to the primary outlet;
a gear box located within the housing and having a drive shaft and an output shaft, with a gear train, including a carrier, operably coupling the drive shaft and the output shaft;
a turbine having a rotor coupled to the drive shaft and a plurality of circumferentially spaced blades extending from the rotor;
a first bearing assembly located radially between the drive shaft and the housing and axially upstream of the gear box; and a second bearing assembly located axially downstream of the gear box, wherein the second bearing assembly is in contact with and rotatably supporting the drive shaft relative to the carrier.

2. The air turbine starter of claim 1, wherein the first bearing assembly is located at a first radial distance from an axis of rotation defined by the turbine and the second bearing assembly is located at a second radial distance from the axis of rotation, wherein the first radial distance is greater than or equal to the second radial distance.

3. The air turbine starter of claim 1, further comprising a third bearing assembly located between the output shaft and the housing.

4. The air turbine starter of claim 3, wherein the third bearing assembly is located axially downstream of the second bearing assembly.

5. The air turbine starter of claim 3, wherein the first bearing assembly is located at a first radial distance from an axis of rotation defined by the turbine and the third bearing assembly is located at a third radial distance from the axis of rotation, wherein the first radial distance is less than or equal to the third radial distance.

6. The air turbine starter of claim 3, further comprising a fourth bearing assembly located between the output shaft and the carrier.

7. The air turbine starter of claim 6, wherein the first bearing assembly is located at a first radial distance from an axis of rotation defined by the turbine and the fourth bearing assembly is located at a fourth radial distance from the axis of rotation, wherein the first radial distance is less than or equal to the fourth radial distance.

8. The air turbine starter of claim 6, wherein a portion of the second bearing assembly is radially spaced and axially overlaps a portion of the fourth bearing assembly.

9. The air turbine starter of claim 6, wherein the fourth bearing assembly is axially downstream of the second bearing assembly.

10. The air turbine starter of claim 6, wherein a portion of the fourth bearing assembly axially overlaps a portion of the third bearing assembly.

11. The air turbine starter of claim 6, wherein a portion of the third bearing assembly circumscribes at least a portion of the fourth bearing assembly.

12. The air turbine starter of claim 1, wherein the air turbine starter includes, in an axial series arrangement, an inlet turbine section, a gearbox section, and a drive section, and wherein the drive shaft extends through a portion of the inlet turbine section.

13. The air turbine starter of claim 1, wherein the air turbine starter includes, in an axial series arrangement, an inlet turbine section, a gearbox section, and a drive section, and wherein the drive shaft extends axially from the inlet turbine section to the drive section.

14. The air turbine starter of claim 1, wherein the first bearing assembly includes multiple bearing assemblies located between the drive shaft and the housing.

15. The air turbine starter of claim 1, further comprising a seal coupled to or unitarily formed with the housing that divides an interior of the housing into an inlet turbine section and a gearbox section.

16. The air turbine starter of claim 15, wherein the first bearing assembly is in contact with the seal.

17. The air turbine starter of claim 15, wherein the seal defines a portion of the primary air flow path.

18. The air turbine starter of claim 15, wherein a rear wall and a central wall of the seal define a cavity, wherein the cavity is fluidly coupled to the first bearing assembly.

19. The air turbine starter of claim 18, wherein the second bearing assembly is to be lubricated with grease or oil from the cavity.

20. The air turbine starter of claim 1, wherein the first bearing assembly is a turbine thrust bearing and the second bearing assembly is a pre-loading bearing that reduces the load of the turbine thrust bearing.

\* \* \* \* \*